US010823873B2

(12) United States Patent
Fouda et al.

(10) Patent No.: US 10,823,873 B2
(45) Date of Patent: Nov. 3, 2020

(54) HIGH-DYNAMIC-RANGE INVERSION FOR PIPE INSPECTION

(71) Applicant: Halliburton Energy Services, Inc., Houston, TX (US)

(72) Inventors: Ahmed Elsayed Fouda, Spring, TX (US); Burkay Donderici, Pittsford, NY (US)

(73) Assignee: Halliburton Energy Services, Inc., Houston, TX (US)

( * ) Notice: Subject to any disclaimer, the term of this patent is extended or adjusted under 35 U.S.C. 154(b) by 15 days.

(21) Appl. No.: 16/334,123

(22) PCT Filed: Oct. 25, 2016

(86) PCT No.: PCT/US2016/058694
§ 371 (c)(1),
(2) Date: Mar. 18, 2019

(87) PCT Pub. No.: WO2018/080462
PCT Pub. Date: May 3, 2018

(65) Prior Publication Data
US 2019/0369285 A1 Dec. 5, 2019

(51) Int. Cl.
*G01V 3/00* (2006.01)
*G01V 3/38* (2006.01)
(Continued)

(52) U.S. Cl.
CPC ............. *G01V 3/38* (2013.01); *E21B 47/00* (2013.01); *G01V 3/10* (2013.01)

(58) Field of Classification Search
CPC ... G01V 3/10; G01V 3/18; G01V 3/28; G01V 3/38; G01N 27/902; G01N 27/904;
(Continued)

(56) References Cited

U.S. PATENT DOCUMENTS 4,292,589 A * 9/1981 Bonner ................. E21B 47/085
324/221
5,670,878 A * 9/1997 Katahara .................. G01V 3/28
324/221
(Continued)

OTHER PUBLICATIONS

PCT Application Serial No. PCT/US16/58694, International Search Report, dated Jul. 25, 2017, 3 pages.
(Continued)

*Primary Examiner* — Minh N Tang
(74) *Attorney, Agent, or Firm* — Gilliam IP PLLC

(57) ABSTRACT

Hybrid frequency/time-domain modeling may be used to compute the synthetic transient response to an eddy-current pulse for use in a high-dynamic-range and efficient inversion method for pulsed-eddy-current pipe inspection tools. In accordance with some embodiments, frequency-domain response signals are computed for a plurality of frequencies and converted, by frequency-to-time-domain transformation, to a first synthetic transient response signal. A time boundary associated with an onset of spurious oscillations in the first synthetic transient response signal is then automatically determined, and a second synthetic transient response signal beginning at the determined time boundary is determined directly with a time-domain numerical technique. A portion of the first synthetic transient response signal ending at the time boundary may be combined with the second synthetic transient response signal.

20 Claims, 13 Drawing Sheets

(51) Int. Cl.
*E21B 47/00* (2012.01)
*G01V 3/10* (2006.01)

(58) Field of Classification Search
CPC ... G01N 27/9046; E21B 47/00; E21B 47/002; E21B 47/007; E21B 47/08; E21B 47/09; E21B 47/10; E21B 47/085; E21B 47/092; E21B 47/113; G01B 7/06; G01B 7/12; G01B 7/13
See application file for complete search history.

(56) References Cited

U.S. PATENT DOCUMENTS

| | | | |
|---|---|---|---|
| 6,065,332 A | 5/2000 | Dominick | |
| 8,076,929 B2 | 12/2011 | Badoux et al. | |
| 9,841,527 B2 * | 12/2017 | Nikitenko | G01V 3/28 |
| 10,139,371 B2 * | 11/2018 | Khalaj Amineh | E21B 47/007 |
| 2006/0202685 A1 | 9/2006 | Barolak et al. | |
| 2015/0355358 A1 | 12/2015 | Aarre et al. | |
| 2016/0290122 A1 | 10/2016 | San Martin et al. | |

OTHER PUBLICATIONS

PCT Application Serial No. PCT/US16/58694, International Written Opinion, dated Jul. 25, 2017, 5 pages.

* cited by examiner

HIGH-DYNAMIC-RANGE INVERSION FOR PIPE INSPECTION

BACKGROUND

In oil and gas field operations, the early detection of any corrosion in the well casing(s) and/or production tubing is important to ensure the integrity and the safety of the oil or gas well. State-of-the art methods for downhole corrosion detection generally involve running a pipe inspection tool in the production tubing. Different types of pipe inspection tools include mechanical calipers, ultrasonic acoustic tools, cameras, electromagnetic flux leakage tools, and electromagnetic induction tools. Among these tools, only electromagnetic induction tools can be used to detect corrosion in outer casings beyond that in which the tool is run.

Existing electromagnetic induction pipe inspection tools generally include at least one transmitting coil and at least one receiving coil. The transmitter generates a time-varying primary field that induces eddy currents inside the metallic pipes, and the receiver records secondary fields generated from the pipes. Those secondary fields bear information about the electrical properties and metal content of the pipes, and can be inverted for any corrosion or loss in metal content of the pipes. Electromagnetic induction tools can be frequency-domain tools that operate at a set of discrete frequencies (with higher frequencies to inspect inner pipes and lower frequencies to inspect outer pipes). Alternatively, electromagnetic induction tools can operate in the time domain by transmitting transient pulses and measuring the decay response versus time (where earlier times corresponds to inner pipes and later times correspond to outer pipes); these tools are referred to as pulsed-eddy-current pipe inspection tools.

Regardless of the type of the pipe inspection tool, model-based inversion is generally employed to estimate the physical and electrical properties of each pipe in the casing string from the measured responses. Model-based inversion uses a computational forward model that simulates the tool and the well pipes and includes various adjustable parameters (such as the thickness and relative magnetic permeability of each pipe, or other pipe parameters), and involves an iterative procedure to find values of the adjustable model parameters that minimize the misfit between measurements and synthetic data generated from the model. The forward model may be invoked on-the-fly within the minimization process, or, alternatively, synthetic data may be pre-computed for different combinations of model-parameter values and stored in a database. In either case, an efficient inversion process depends on a fast and accurate model.

DESCRIPTION

Figure 1:
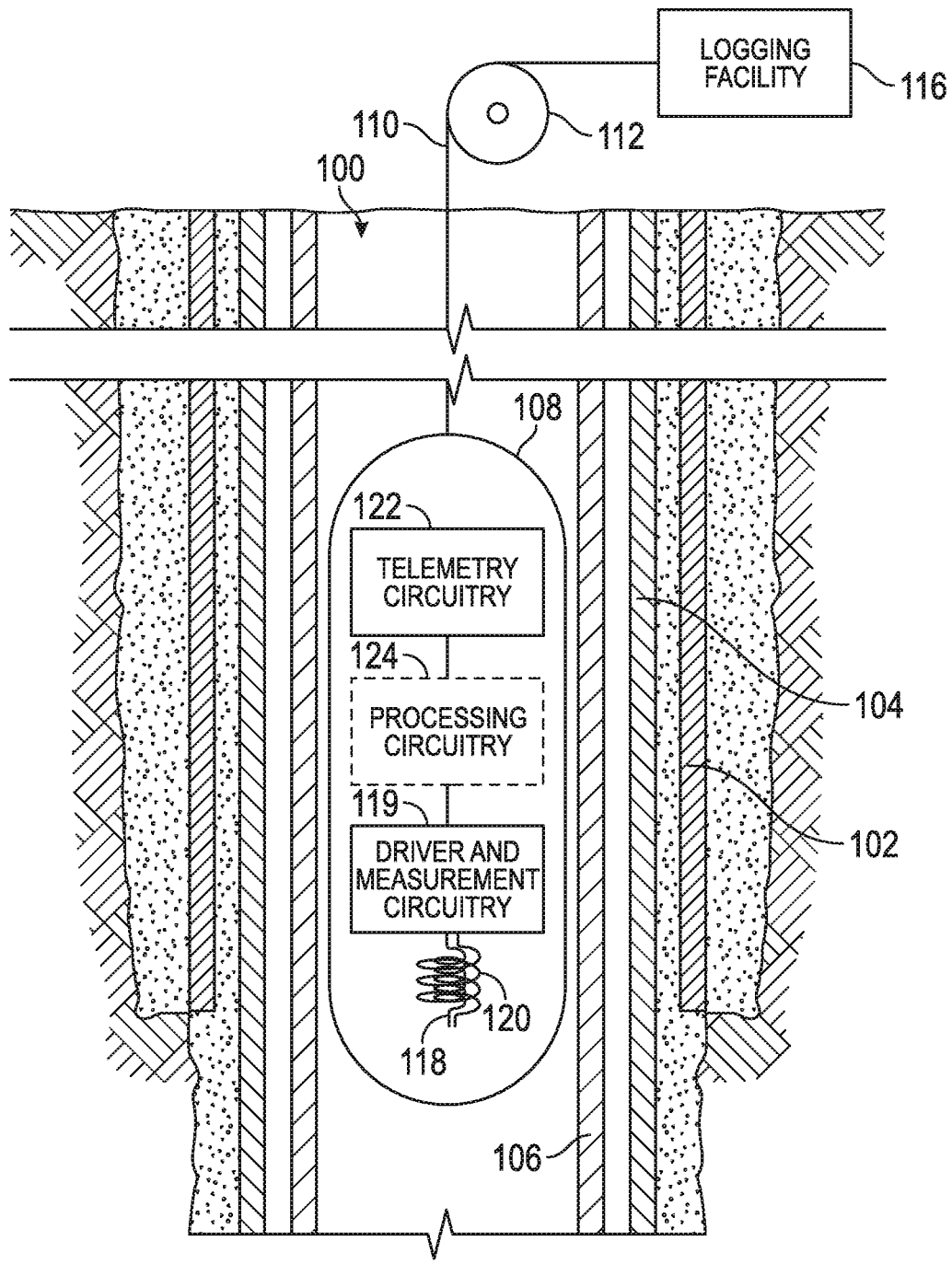
FIG. 1 is a diagram of a pipe inspection system deployed in an example borehole environment, in accordance with various embodiments.

Disclosed herein is a high-dynamic-range and efficient inversion method for pulsed-eddy-current (i.e., time-domain) pipe inspection tools that is based on hybrid frequency/time-domain modeling to compute the synthetic transient response to an eddy-current pulse.

Conventionally, there are two approaches to computing the synthetic transient response signal for a pulsed-eddy-current tool: frequency-to-time-domain conversion and direct time-domain computation. In the first approach, a frequency-domain solver (such as, e.g., a semi-analytical method or a finite element method (FEM)) is used to compute the transient response signal in the frequency domain, from which the time-domain transient response signal is then computed using a frequency-to-time-domain transformation (such as, e.g., inverse Fourier transform). With this approach, the time-domain signal is generally not stable, as it suffers spurious oscillations, for late times, especially in pipe configurations with low metal content, e.g., with a small number of concentric pipes, pipes with thin walls, or pipes with low effective permeability. (Here, effective permeability is the equivalent permeability of a wholespace that would generate a signal of same signal magnitude as a pipe that has a certain relative permeability value. Effective permeability is a function of coil geometry, pipe geometry, and pipe relative permeability while pipe relative permeability is the property of the material and does not depend on any geometry.) In the second approach, a time-domain solver (such as, e.g., a finite difference time-domain (FDTD) method) is used to directly compute the time-domain transient response signal. This approach can be prohibitively slow since very small time steps are needed to get stable responses at early times.

In various embodiments described herein, a hybrid approach is used to address the problems that the conventional approaches suffer when individually employed. In this hybrid approach, first, the frequency-domain transient response signal is computed and transformed into a time-domain transient response signal (e.g., in the conventional manner) to provide a synthetic time-domain transient response that is accurate at early times. The time boundary at which the synthetic time-domain transient response signal resulting from the frequency-to-time-domain transformation starts to fail (i.e., which is associated with the onset of spurious oscillation) is automatically detected. A time-domain solver is then run for the portion of the synthetic time-domain response signal beginning at the detected time boundary to provide an accurate response at late times; the time step used in the time-domain solver may be computed based on the time boundary. The time-domain signal portion computed from the frequency-domain signal and ending at the time boundary and the time-domain signal portion directly computed in the time domain and beginning at the time boundary are then combined into an overall synthetic time-domain response signal that is accurate at both early and late times.

The hybrid method generally provides a larger dynamic range of the synthetic response signal (i.e., a larger ratio between longest and shortest times at which the synthetic response signal is accurate) than the purely frequency-domain solution, and is faster than a purely time-domain solution since larger time steps can be used in the time-domain solver, which is beneficial in various applications. For instance, a high-dynamic-range method enables advanced processing of pulsed-eddy-current response signals, e.g., to solve for parameters such as the eccentricity of the tool or the pipes, or to simultaneously estimate the magnetic permeability and thickness of each pipe. It is well-established in inversion theory that, as the number of unknown (i.e., adjustable) parameters in the model of the tool and pipe configuration increases, more independent measurements are generally needed to solve for those unknowns. Increasing the dynamic range of the synthetic response signal provides for more independent measurements (due to a longer response with more independent time samples), thus allowing a larger number of adjustable parameters to be used in the model. An efficient, high-dynamic-range method also enables building a more accurate planner. A planner can be used to optimize various parameters of the tool operation and the inversion algorithm, such as the duration of the measured transient response signal to be used in inversion, or the weights applied in the inversion to different time samples and different transmitter/receiver arrays, based on synthetic modeling of the sensitivity of the tool to a given pipe configuration. For accurate planning, the model should enable computing the transient response over the full dynamic range measurable by the tool.

The foregoing will be more readily understood from the following description and the accompanying drawings.

FIG. 1 is a diagram of a pipe inspection system deployed in an example borehole environment, in accordance with various embodiments. The borehole 100 is shown during a wireline logging operation, which is carried out after drilling has been completed and the drill string has been pulled out. As depicted, the borehole 100 has been completed with surface casing 102 and intermediate casing 104, both cemented in place. Further, a production pipe 106 has been installed in the borehole 100. Annulus fluid fills the space between the production pipe 106 and casing 104. The pipes 102, 104, 106 are generally made of metal, typically steel. The spacing between the pipes may be filled with cement, mud, or other borehole fluids. While three pipes 102, 104, 106 are shown in this example, the number of nested pipes may generally vary, depending, e.g., on the depth of the borehole 100. The pipe inspection methods described herein are generally applicable sets of pipes including any number of pipes, such as a single pipe or two or more nested pipes.

Wireline logging generally involves measuring physical parameters of the borehole 100 and surrounding formation—such as, in the instant case, the condition of the pipes 102, 104, 106—as a function of depth within the borehole 100. The pipe measurements may be made by lowering an electromagnetic induction pipe inspection tool 108 into the borehole 100, for instance, on a wireline 110 wound around a winch 112 mounted on a logging truck. The wireline 110 is an electrical cable that, in addition to delivering the tool 108 down hole, may serve to provide power to the tool 108 and transmit control signals and/or data between the tool 108 and a logging facility 116 (implemented with a suitable combination of hardware and/or software, e.g., with a suitably programmed general-purpose computer including one or more processors and memory) located above surface, e.g., inside the logging truck. In some embodiments, the tool 108 is lowered to the bottom of the region of interest and subsequently pulled upward, e.g., at substantially constant speed. During this upward trip, the tool 108 may perform measurements on the pipes, either at discrete positions at which the tool 108 halts, or continuously as the pipes pass by.

For pulsed-eddy-current measurements, the tool 108 includes an electromagnetic transmitter, such as a current-carrying coil 118 and associated driver and measurement circuitry 119, that can be operated to emit electromagnetic pulses towards the pipes 102, 104, 106 to induce pulsed eddy currents therein. Scattered electromagnetic waves from the casing strings 102, 104, 106 are captured, as the transient electromagnetic response signal, with a receiver coil 120 connected to the driver and measurement circuitry 119. Alternatively, changes in the current flowing through the coil 118 that result from the response of the casing to the induced eddy currents may be measured, allowing the transmitter coil 118 to double as the receiver coil. Hereinafter, no distinction is made between electromagnetic response signals acquired by a transmitter/receiver or a separate receiver, as the processing methods described below are equally applicable to both.

The tool 108 may further include telemetry circuitry 122 for transmitting the measured transient response signals to the logging facility 116 for processing and/or storage thereat, or memory (not shown) for storing the response signals downhole for subsequent data retrieval once the tool has been brought back to the surface. Optionally, the tool 108 may contain analog or digital processing circuitry 124 (e.g., an embedded microcontroller executing suitable software) that allows the measured response signal to be processed at least partially downhole (e.g., prior to transmission to the surface). In any case, a log, that is, a sequence of measurements correlated with the depths along the borehole 100 at which they are taken, will be generated. The computer or other circuitry used to process the measured transient electromagnetic response signals to derive pipe parameters based thereon is hereinafter referred to as the processing facility, regardless whether it is contained within the tool 108 as processing circuitry 124, provided in a separate device such as logging facility 116, or both in part. Collectively, the pipe inspection tool 108 and processing facility (e.g., 124 and/or 116) are herein referred to as a pipe inspection system.

Alternatively to being conveyed downhole on a wireline, as described above, the pipe inspection tool 108 can be deployed using other types of conveyance, as will be readily appreciated by those of ordinary skill in the art. For example, the tool 108 may be lowered into the borehole by slickline (a solid mechanical wire that generally does not enable power and signal transmission), and may include a battery or other independent power supply as well as memory to store the measurements until the tool 108 has been brought back up to the surface and the data retrieved. Alternative means of conveyance include, for example, coiled tubing, downhole tractor, or drill pipe (e.g., used as part of a tool string within or near a bottom-hole-assembly during logging/measurement-while-drilling operations).

Figure 2A:
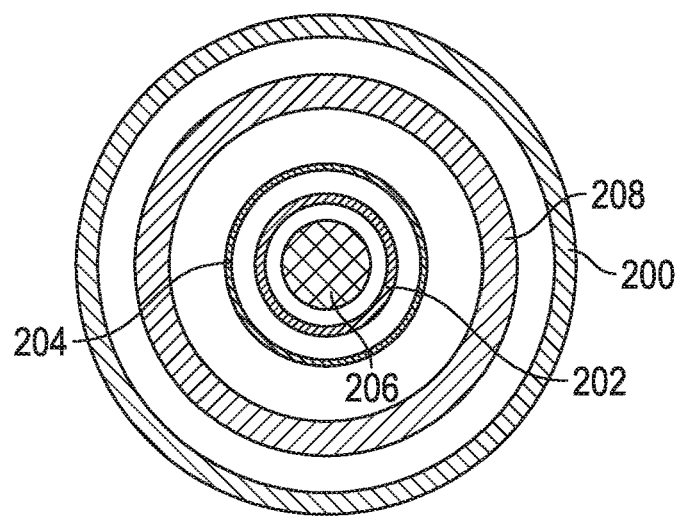
FIGS. 2A and 2B are cross-sectional and side views, respectively, of an example configuration of an electromagnetic induction pipe inspection tool run in a pipe, in accordance with various embodiments.
Figure 2B:
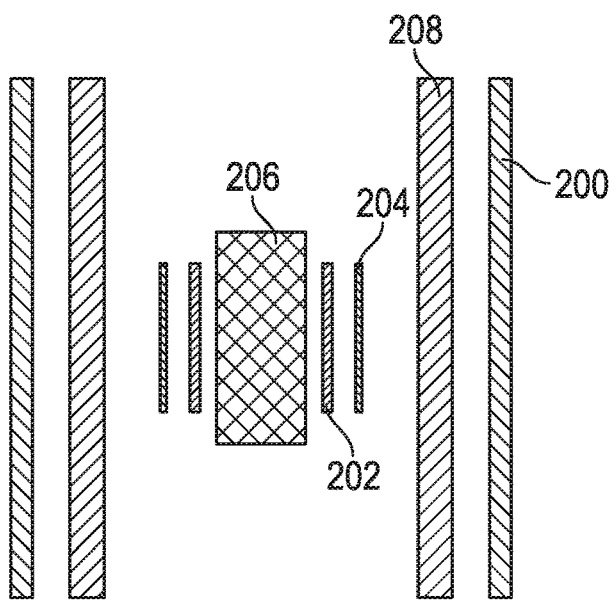

FIGS. 2A and 2B further illustrate, in cross-sectional and side views, respectively, an example configuration of an electromagnetic induction tool 108 run in a pipe 200 (e.g., corresponding to the production tubing 106). The example tool 108 includes one (as shown) or more arrays of coaxial transmitting coil 202 and receiving coil 204 with given axial lengths, and optionally a magnetic core 206 made of a high-permeability material, such as a ferrite. A non-magnetic tool housing 208 may enclose the coils 202, 204 and core 206, as well as any associated circuitry (such as, e.g., driver and measuring circuitry 119, telemetry circuitry 122, and processing circuitry 124).

Figure 3:
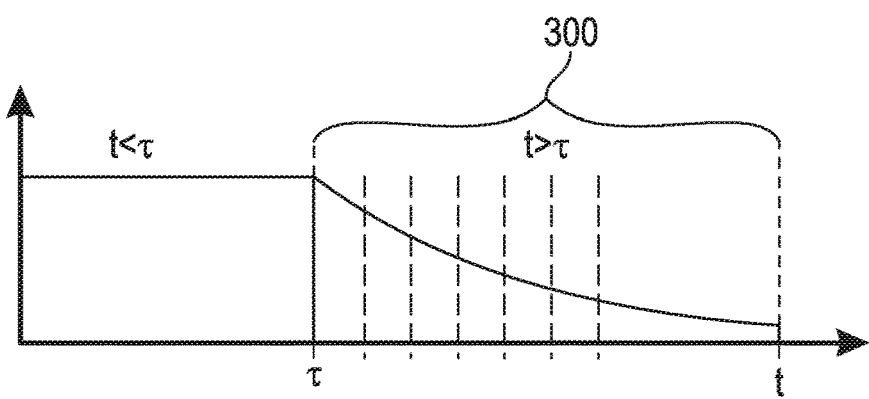
FIG. 3 is a graph of an example time-dependent response to a pulsed eddy current, in accordance with various embodiments.

FIG. 3 is a graph of the time-dependent response to a step-function pulsed eddy current, e.g., as measured by a receiver coil 120. During times t<τ, an alternating current flowing through the transmitter coil 118 generates an alternating primary magnetic field, which induces alternating eddy currents in the pipe(s) surrounding the transmitter coil 118. These eddy currents, in turn, create an alternating secondary magnetic field, which induces a voltage across or current through the receiver coil 120. A constant amplitude of the current through the transmitter coil 118 will result in the depicted constant amplitude of the current in the receiver coil 120. At t=τ, the current through the transmitter coil 118 is turned off (e.g., in accordance with an approximate step function), resulting in an eddy current pulse that causes a transient, decaying secondary magnetic field reflected in a transient decay response signal 300 (e.g., a "step response" signal) measured at the receiver coil 120. The strength of that transient response signal 300 at different times is sensitive to parameters of different pipes within a set of multiple nested pipes. For example, the signal at early times is more sensitive to the innermost pipes, whereas the signal at late times is sensitive to both inner and outer pipes. Accordingly, the transient response signal 300 can be subdivided into multiple time slots (indicated by dashed lines), and sampled in and inverted for different time slots to estimate the parameters of different pipes.

Figure 4:
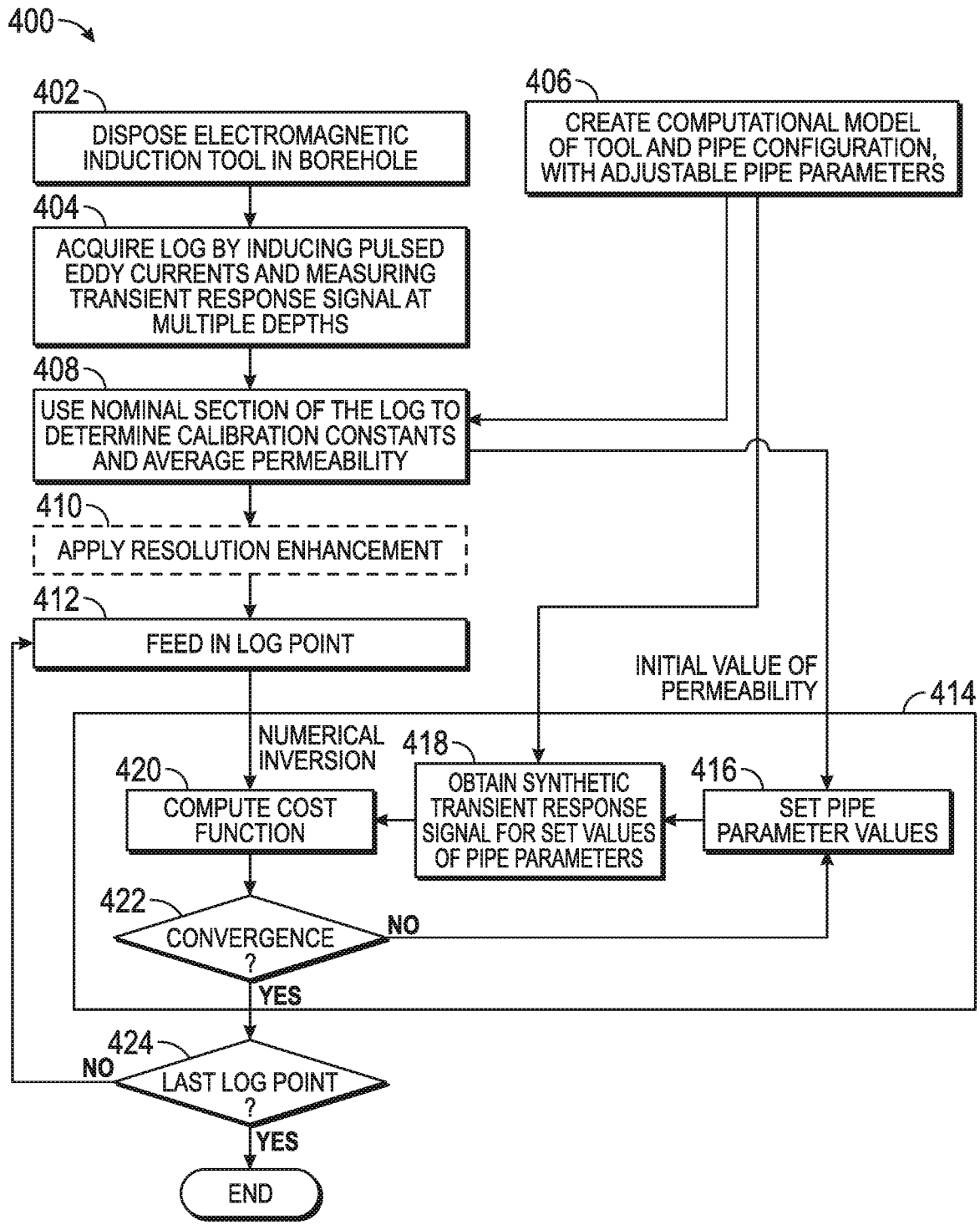
FIG. 4 is a flow chart of a method for pipe inspection using pulsed eddy currents, in accordance with various embodiments.

FIG. 4 is a flow chart of a method 400 for pipe inspection using pulsed eddy currents, in accordance with various embodiments. The method includes disposing an electromagnetic induction tool (such as the tool 108) in a borehole (act 402) and acquiring a log by inducing pulsed eddy currents and measuring the transient response signal at multiple depths within the borehole (act 404), e.g., at regular depth intervals as the tool is lowered into or pulled out of the borehole. Further, a computational model of the tool and the pipe configuration of the borehole, which may include a single pipe or a set of multiple nested pipes, is created (act 406). The computational model is based on a-prior knowledge of the pipe configuration (such as on the number of pipes, their outer diameters, nominal thickness, and electrical conductivity), and includes one or more adjustable pipe parameters whose values are to be determined during the subsequent numerical inversion process to minimize a mismatch between the measured transient response signal and a synthetic transient response signal computed based on the model, as described in detail below. (The term "minimize," as used herein, refers to a reduction of the mismatch to a value below a set threshold, e.g., as measured in terms of a cost function, and is not intended to imply that an absolute minimum is reached.) The adjustable parameters may include, e.g., the relative magnetic permeabilities of the pipes, which are generally not precisely known a priori and can vary significantly from one casing section to another, and the pipe thicknesses, which can deviate from the nominal thicknesses due to, e.g., corrosion. The relative permeabilities of pipes used in well casing typically range from 1 to 120.

In some embodiments, the log is processed in multiple portions, e.g., each corresponding to one casing section, by stacking the log points of that portion in an input data buffer. The log, or each buffered log portion, may be calibrated (act 408) to compensate for any discrepancy between the actual tool and the computational model of the tool. In various embodiments, the prior knowledge of the nominal thickness of the pipes is exploited to determine calibration constants for the tool. Calibration constants may be real-valued or complex-valued. Each transmitter, receiver, or transceiver may have one associated constant. An average magnetic permeability for the pipes (or sections thereof) may be determined as well by matching the measured transient response for a nominal pipe section (i.e., a pipe section that can be assumed not to have undergone corrosion) to the synthetic transient response computed from the computational model of that section. The determined calibration constants are then applied to the entire log portion in the input data buffer, and the computed average magnetic permeability is used as a starting point in the inversion process. In some embodiments, a resolution enhancement technique that involves de-convolving the impulse response of the tool is applied to sharpen the measured transient response signal (act 410).

The calibrated, resolution-enhanced log (or log portion) is fed pointwise (in act 412) into the numerical inversion process. (A "log point" refers to the transient response signal measured at a particular depth.) The numerical inversion (act 414) serves to convert the measured transient response signals to the values of the adjustable pipe parameter(s) that minimize a mismatch between measured and synthetic response signals. To compute the synthetic response signal, a forward model of the induction of eddy currents and the creation of the secondary magnetic field and resulting response signal at the receiver is employed. As depicted, the numerical inversion (act 414) may include an iterative process in which, during each iteration, values for the adjustable pipe parameters at the depth at which the fed-in log point was acquired are set (act 416) (starting, in the first iteration, with an initial guess, which may be based on the nominal pipe parameters and may include the average permeability as estimated in act 404), and the synthetic transient response signal computed from the computational model with the set parameter values is obtained (act 418). The synthetic response signal for a given set of pipe-parameter values may be computed on the fly during the respective iteration. Alternatively, synthetic response signals may be precomputed for multiple sets of pipe-parameter values, and the precomputed synthetic response signal for the given set of pipe-parameter values simply be retrieved during the iterative process. Whether precomputed or computed on the fly, the synthetic transient response signal (obtained in act 418) is compared against the measured transient response signal (fed into at 412) to determine the mismatch, e.g., in terms of a cost function (computed in act 420). The parameter values are adjusted iteratively until the synthetic and measured transient response signals converge (as determined in act 422) as reflected, e.g., in the value of the cost function falling below a specified convergence threshold. The pipe-parameter values that minimize the mismatch (in the sense that they have resulted in convergence of the measured and synthetic response signals) can then be returned. The numerical inversion (act 414) is repeated for subsequent log points until the last log point has been processed (as determined in act 424).

In some embodiments, the cost function F used to quantify the mismatch between measured and synthetic transient response signals is formed from the linear combination of a misfit function and a stabilizing function (also known as the regularization term), for example, as follows:

$$F(\vec{x}) = \frac{1}{M} \left\| W_{\vec{m}} \times \left[ \frac{\vec{s}(\vec{x})}{W_{cal}\vec{m}} - 1 \right] \right\|_2^2 + |W_{\vec{x}} \times (\vec{x} - \vec{x}_{nom})|_1$$

Herein, z is a vector of N unknowns corresponding to the adjustable model parameters (e.g., $\vec{x}=[t_1, \ldots, t_{NP}, \mu_1, \ldots, \mu_{NP}]$, which includes the thicknesses and relative magnetic permeabilities of NP pipes), $\vec{x}_{nom}$ is a vector of the nominal model parameters, iii is a vector of M real-valued measurements at different time slots and receivers (with $M=N_{Rx} \cdot N_{TS}$, where $N_{Rx}$ is the number of receivers and $N_{TS}$ is the number of time slots in the transient response signal), $\vec{s}(\vec{x})$ is the corresponding M-valued vector of the synthetic transient response signal, $W_{\vec{m}}$ is an M×M matrix of measurement weights, $W_{cal}$ is an M×M diagonal matrix of real-valued calibration constants, and $W_{\vec{x}}$ is an M×M diagonal matrix of regularization weights. The misfit function is formed as the L2-norm squared of the weighted difference between calibrated measurements $W_{cal}\vec{m}$ and data predicted by the synthetic model $\vec{s}(\vec{x})$, and is normalized by the number of measurements M to make the cost function F independent of the number of measurements. The stabilizing function is formed as the L1-norm of the weighted difference between model parameters 2 and the nominal model parameters $\vec{x}_{nom}$. This way, regularization penalizes large variations of the thicknesses from the nominal thicknesses, and helps mitigate non-uniqueness problem that may arise in cases involving many (e.g., four or more) pipes.

Figure 5:
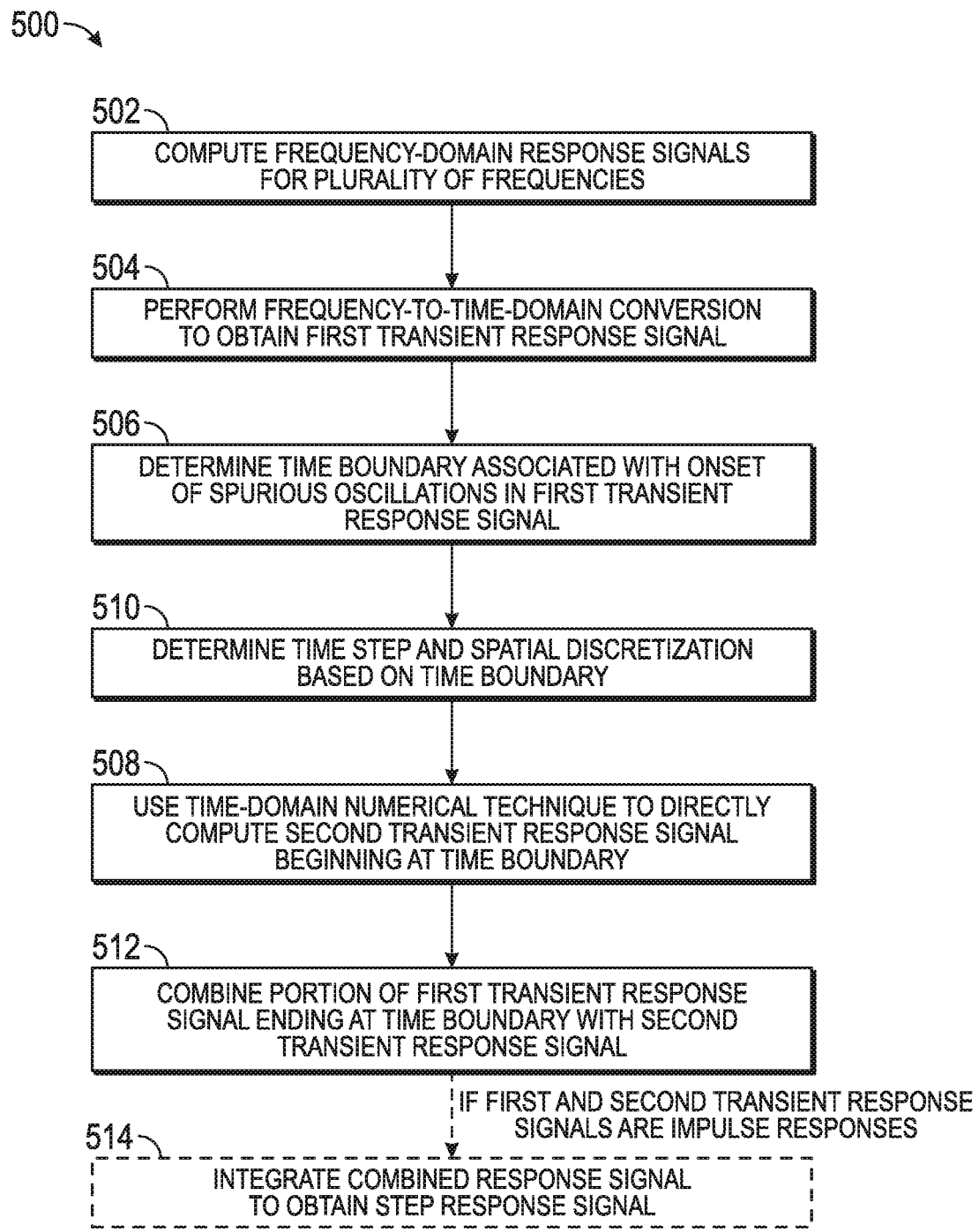
FIG. 5 is a flow chart of a method for computing a hybrid synthetic transient response signal, in accordance with various embodiments.

FIG. 5 is a flow chart of a method 500 for computing a synthetic transient response signal, in accordance with various embodiments. As mentioned with reference to FIG. 4, this method 500 may be employed to compute the synthetic transient response signals on the fly during iterative numerical inversion (act 418), or to precompute synthetic response signals for subsequent retrieval of one of the precomputed signals during each iteration. The method 500 takes a set of pipe-parameter values (e.g., pipe diameters, thicknesses, and effective magnetic permeabilities) as input, and includes first performing frequency-domain forward modeling to compute frequency-domain response signals for a plurality of frequencies (act 502) and using frequency-to-time-domain transformation to convert the plurality of computed frequency-domain response signals to a first time-domain synthetic transient response signal (act 504). From the first time-domain synthetic transient response signal, a time boundary associated with an onset of spurious oscillations within the signal is automatically determined (act 506). Time-domain forward modeling (e.g., using an FDTD simulation or other time-domain numerical technique) is subsequently used to compute a second synthetic transient response signal beginning at the determined time boundary directly (act 508). The time step and spatial discretization used in the time-domain forward modeling may be determined, in act 510 (prior to act 508), based on the time boundary; in some embodiments, this involves boosting the electric permittivity of the material filling the annulus between the pipes to allow for a larger time step (as explained in detail below). Following the time-domain computation of the second synthetic transient response signal, a portion of the first synthetic transient response signal ending at the time boundary is combined with the second synthetic transient response signal to yield an overall synthetic transient response signal (act 512). In some embodiments, the first and second transient response signals, and thus also the combined transient response signal, are impulse responses, which correspond to the signal acquired at the receiver in response to a brief pulse from the transmitter. In this case, the combined transient response may be integrated (act 514) to obtain a synthetic step response signal, which captures how the receiver signal decays in time following an abrupt (step-like) turn-off of the transmitter. In other embodiments, the first and second transient response signals are step response signals at the outset.

In more detail, a frequency-domain solver, such as a semi-analytical method or FEM, is used to compute the response in the frequency domain (act 502), and then a frequency-to-time domain transformation technique, such as inverse Fourier transformation, is used to compute the transient time-domain response signal (act 504). The generated time-domain response signal suffers instabilities, in the form of oscillations, at late times due to the finite precision of the frequency-to-time domain transformation technique. These instabilities tend to be more pronounced in scenarios involving few pipes (e.g., only one or two pipes) and/or pipes with low effective permeability. The time at which the time-domain response signal obtained by frequency-to-time-domain transformation starts to oscillate (i.e., the time boundary between stable and unstable signal portions) is automatically detected, in act 506, and is hereinafter denoted by $t_{max}$ (indicating the maximum time up to which the computed time-domain response can be considered accurate, and after which the response becomes unstable). The time boundary $t_{max}$ can be determined algorithmically, e.g., by inspecting a synthetically generated impulse response IR, which should, theoretically, be a monotonically decaying function of time, and picking the earliest time at which an increase of the impulse response can be observed, such that $IR(t_{max}+\delta t) > IR(t_{max})$, where $\delta$ is a fixed, small time step.

Following determination of the time boundary $t_{max}$ (act 506), a time-domain solver, such as an FDTD, finite element time domain (FETD), or other time-domain based method that is accurate and provides a high dynamic range at late times, is employed to directly compute late time-portions of the response (i.e., the portion for $t > t_{max}$). To ensure numerical stability, the time step used by the solver is chosen to not exceed a maximum value determined by the well-known Courant stability condition:

$$\Delta t \leq \frac{\sqrt{\epsilon_r}}{c_0 \sqrt{\frac{1}{\Delta x^2} + \frac{1}{\Delta y^2} + \frac{1}{\Delta z^2}}},$$

where $C_0$ is the speed of light in free space, $\epsilon_r$ is the relative permittivity of the material filling the annulus between the pipes, and $\Delta x$, $\Delta y$, and $\Delta z$ are the spatial discretizations in the x, y, and z directions, adequately chosen to resolve the geometrical details of the modeled problem (e.g., detail of the tool and pipe configuration) and/or the principal components of the spectrum of wavelengths propagating in the numerical grid. In accordance with various embodiments, the fact that the time-domain solver is run only for times greater than $t_{max}$ is exploited to increase the spatial discretization and/or to boost the relative permittivity so as to allow for larger time steps while still meeting the Courant condition.

In lossy media, the spatial discretization may be chosen based on the frequency spectrum of the signal, e.g., such that the skin depth (within the pipes) corresponding to the highest frequency in the spectrum of interest is sampled by at least ten grid points. When using FDTD to compute the late-time portion of the transient response signal, i.e., the signal portion for $t > t_{max}$, the maximum frequency of interest is inversely proportional to $t_{max}$. Further, for a given receiver coil and pipe, a frequency-domain measurement $V_{frequency}(f)$ at frequency f is, to a good approximation, proportional to a time-domain measurement $V_{time}(1/f)$ at time $t = 1/f$, due to the strong dispersive nature of the problem. Accordingly, the maximum frequency of interest $f_{max}$ can be taken as $1/t_{max}$ (or a substantially similar value, such as any value between $1/(2t_{max})$ and $2/t_{max}$). From $f_{max}$, in conjunction with material properties of the pipes (such as the magnetic permeability, electric resistivity, and electric permittivity), the skin depth can be computed. The computed skin depth, in turn, determines the spatial discretization. A smaller maximum frequency of interest corresponds to a larger minimum wavelength of interest and, thus, a larger skin depth and larger spatial discretization. Thus, use of a frequency-domain solver to compute the early-time portion of the response (i.e., the response for $t < t_{max}$) can significantly accelerate the FDTD simulation by allowing for larger spatial discretization and, consequently, a larger time step. Further, as the simulation progresses towards later times, the maximum frequency of interest decreases. In some embodiments, the spatial discretization and time step are adaptively increased, one or more times during computation of the second synthetic response signal, based on this decrease of the maximum frequency of interest for later times, which further speeds up the FDTD simulation.

As apparent from the Courant stability condition recited above, the time step for the FDTD simulation, and thus the total simulation time for computing the response for a given duration, is proportional to the square root of the relative permittivity $\epsilon_r$. It is therefore desirable to boost the permittivity to reduce the simulation time, as long as this can be done without impacting the physics of the problem. From Maxwell's equations (in particular, Ampere's law), the complex electric permittivity of the borehole fluid filling the annuli between the pipes is given by $$\epsilon = \epsilon_0 \epsilon_r + \frac{\sigma_{b\_fl}}{j\omega},$$

where $\epsilon_0$ is the electric permittivity of free space ($8.85 \times 10^{-12}$ F/m), $\epsilon_r$ is the relative permittivity of the borehole fluid (e.g., mud), co is the angular frequency ($\omega = 2\pi f$), and $\sigma_{b\_fl}$ is the electric conductivity of the borehole fluid. For the range of frequencies generally contained in the transient response to pulsed eddy currents in the application scenarios contemplated herein, the second, imaginary term in the above equation is generally much larger than the first term. Therefore, for purposes of the FDTD simulation, the actual value $\epsilon_r$ of the relative permeability can be boosted safely (i.e., without affecting the physics) to a "mathematical" value $\epsilon_{boost} \gg \epsilon_r$ (e.g., $\epsilon_{boost} > 10 \cdot \epsilon_r$) as long as $\omega_{max} \epsilon_0 \epsilon_{boost} \ll \sigma_{b\_fl}$, where is the highest angular frequency used in computing the FDTD response $$\left( \omega_{max} \sim \frac{2\pi}{t_{max}} \right).$$

For example, $\epsilon_{boost}$ may be chosen as:

$$\epsilon_{boost} = \frac{\sigma_{b\_fl} t_{max}}{2\pi \epsilon_0 \cdot 10},$$

which ensures that $\epsilon_{boost}$ does not exceed 10% of the second, imaginary term within the frequency range of interest. With such a boosted value, the FDTD simulation will provide a numerically stable impulse response for times $t > t_{max}$. Beneficially, the boosted permittivity speeds up the time-domain simulation by allowing for larger time steps. In some embodiments, the simulation efficiency is further increased by implementing adaptive permittivity boosting, that is, $\epsilon_{boost}$ is progressively increased (one or more times) as time-domain modeling proceeds. For example, at certain times $t > t_{max}$, $\epsilon_{boost}$ may be recomputed in accordance with $$\epsilon_{boost} = \frac{\sigma_{b\_fl} t}{2\pi \epsilon_0 \cdot 10}$$

to use successively larger time steps at later times.

Figure 6:
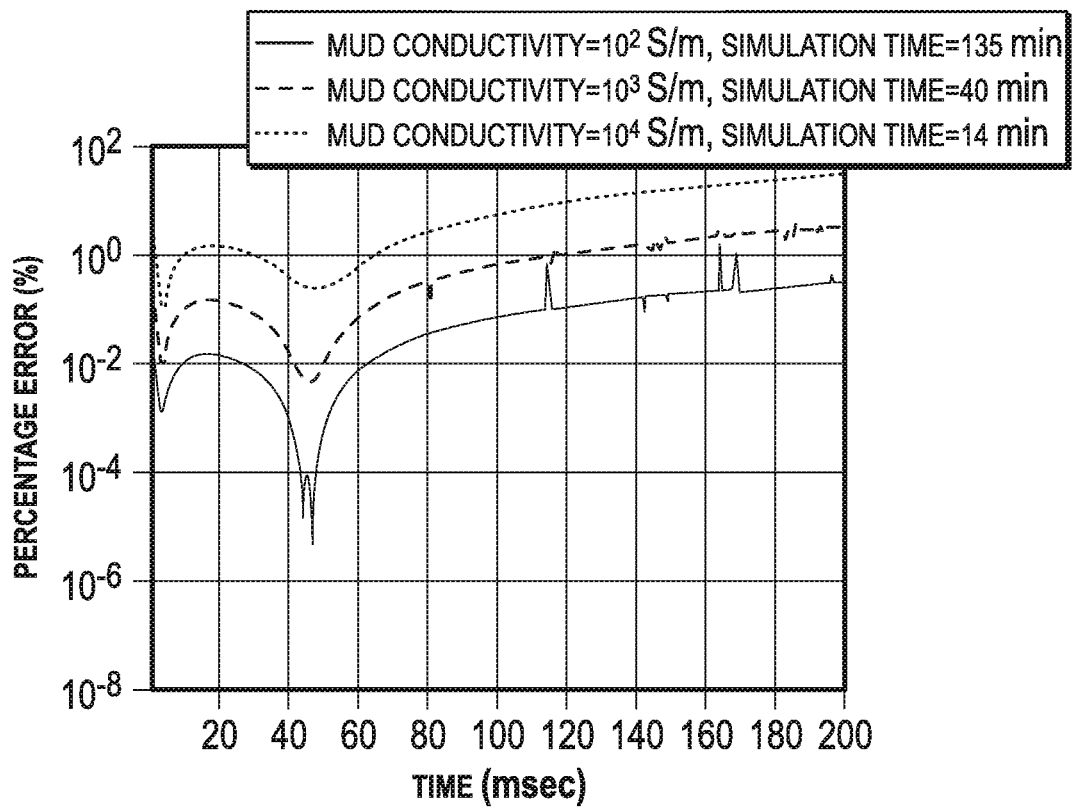
FIG. 6 is a graph of the percentage errors in the synthetic step response signal resulting from boosting the borehole-fluid conductivity to various increased values, in accordance with various embodiments.

As the above formula reflects, the highest value that $\epsilon_{boost}$ can take is principally limited by the conductivity $\sigma_{b\_fl}$ of the borehole fluid. In many practical applications, this conductivity is rather low; for example, for oil-based mud, it can be as low as about $10^{-3}$ S/r, which results in long (possibly prohibitively long) simulation times. It has been observed, however, that the physics of the pipe-inspection problem changes only slightly if a non-realistically high, "mathematical" mud conductivity (or, more generally, borehole-fluid conductivity) is used in lieu of the true conductivity. This is illustrated in the graphs of FIG. 6, which show, for mathematical conductivities of $10^2$ S/m, $10^3$ S/m, and $10^4$ S/m, respectively, the percentage error in the synthetic step response signal relative to a synthetic response signal computed for a typical, realistic conductivity value of $10^{-2}$ S/m, plotted over a time span of 200 ms. The legend also indicates the total simulation time for the three plotted cases, which decreases from 135 minutes for the smallest mathematical conductivity to 14 minutes for a mathematical conductivity that is two orders of magnitudes higher. The simulation underlying FIG. 6 is based on a configuration of four nested pipes with properties as summarized in Table 1 below. As can be seen in FIG. 6, a conductivity of $10^3$ S/m ensures an error below 10% over the entire time interval of interest while achieving a reasonable simulation time. Accordingly, in various embodiments, the conductivity $\sigma_{b\_fl}$ of the borehole fluid is boosted, e.g., by a factor of at least 10 (and in some instance by two or more orders of magnitude), while maintaining a resulting error in the synthetic transient response signal below a tolerable threshold, e.g., below ten percent.

By computing the transient time-domain response signal for early times ($t<t_{max}$) from frequency-domain response signals and for late times ($t>t_{max}$) directly by time-domain simulation, the trade-off between accuracy and efficiency can be greatly improved, compared with using either only frequency-domain-based modeling or only time-domain-based modeling. From the frequency-domain-based first transient response signal for $t<t_{max}$ and the time-domain-based second transient signal for $t>t_{max}$, a hybrid transient response signal can be computed (act 512). If the hybrid response signal is an impulse response, it can further be integrated (act 514) to yield the hybrid synthetic step response signal. This hybrid synthetic step response signal can then be compared against a measured step response signal to minimize a mismatch between the two in a numerical optimization procedure, whereby the measured response is inverted to yield values for the adjustable pipe parameters of the model.

Figure 7A:
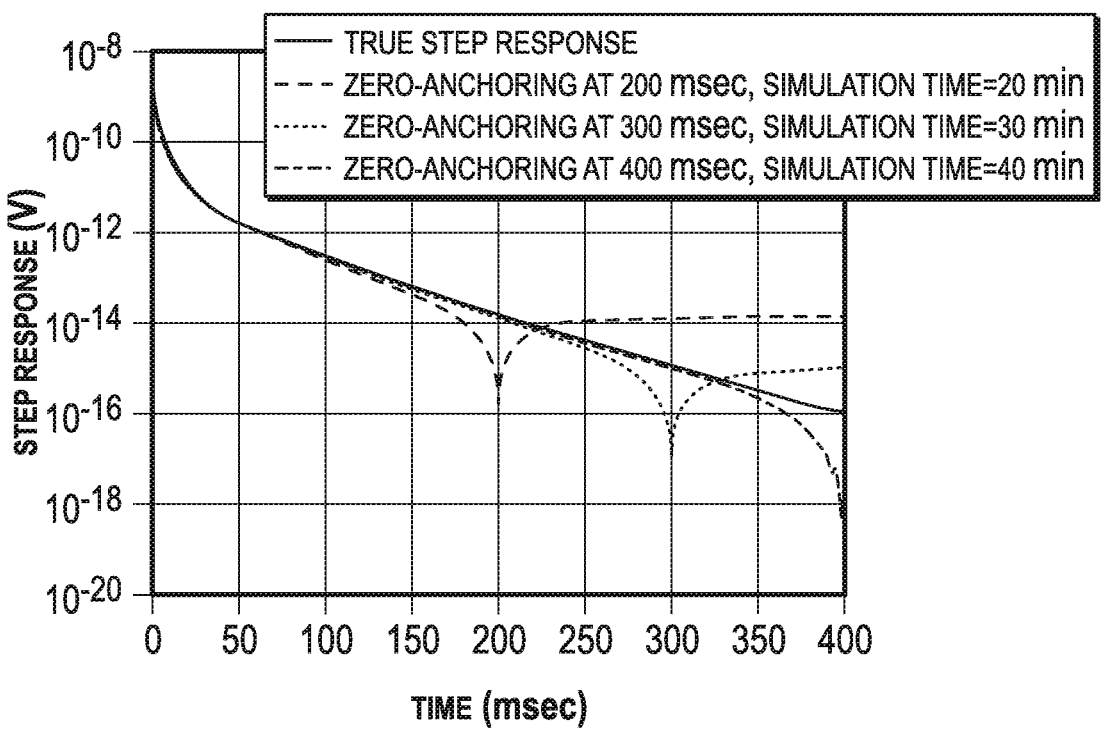
FIG. 7A is a graph of a true synthetic step response and corresponding step responses zero-anchored at various times, in accordance with various embodiments.
Figure 7B:
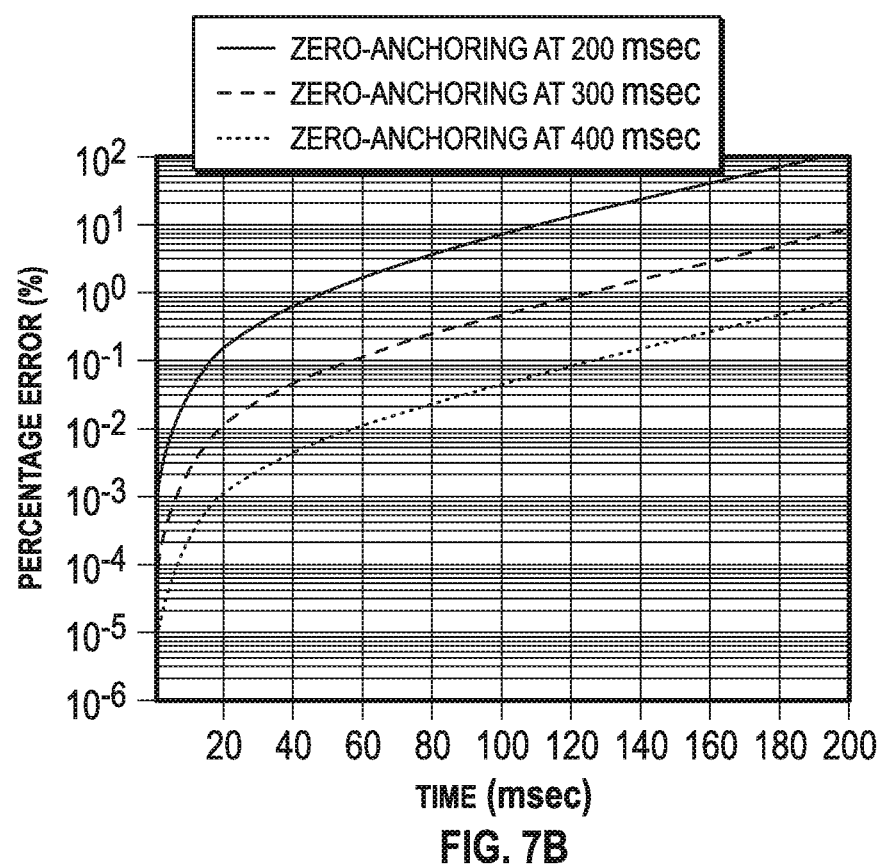
FIG. 7B is a graph of the percentage errors of the zero-anchored step responses of FIG. 7A relative to the true step response, in accordance with various embodiments.

When computing the hybrid step response signal by integrating the hybrid impulse response signal, any slight level mismatch between the early-time (frequency-domain-based) and late-time (time-domain-based) portions of the hybrid impulse response can cause a significant error in the step response at late times. To mitigate this problem, the fact that the step response in lossy media decays monotonically with time (as a matter of physics) may be used to anchor the step response signal to zero, at a time sufficiently larger than the maximum time of interest in the synthetic signal, without compromising the accuracy of the solution in the time interval of interest. (The maximum time of interest corresponds to the end of the time interval used to compute the mismatch between measured and synthetic transient response signals.) FIGS. 7A and 7B illustrate such zero-anchoring. The simulation underlying FIGS. 7A and 7B is based on a configuration of four nested pipes with properties as summarized in Table 1 below. In FIG. 7A, an example true step response is shown along with three curves for that step response anchored at 200 ms, 300 ms, and 400 ms, respectively. The legend also indicates the respective simulation times, which increase for later zero-anchoring times. In FIG. 7B, the percentage error between the true and zero-anchored step responses is plotted for all three cases for the time interval of interest, which is taken to be the interval up to 200 ms. As can be seen, zero-anchoring at times $t_{anchor}>300$ ms ensures an error below 10% throughout the interval of interest. In some embodiments, $t_{anchor}$ is chosen to be at least twice the maximum time of interest.

Figure 8:
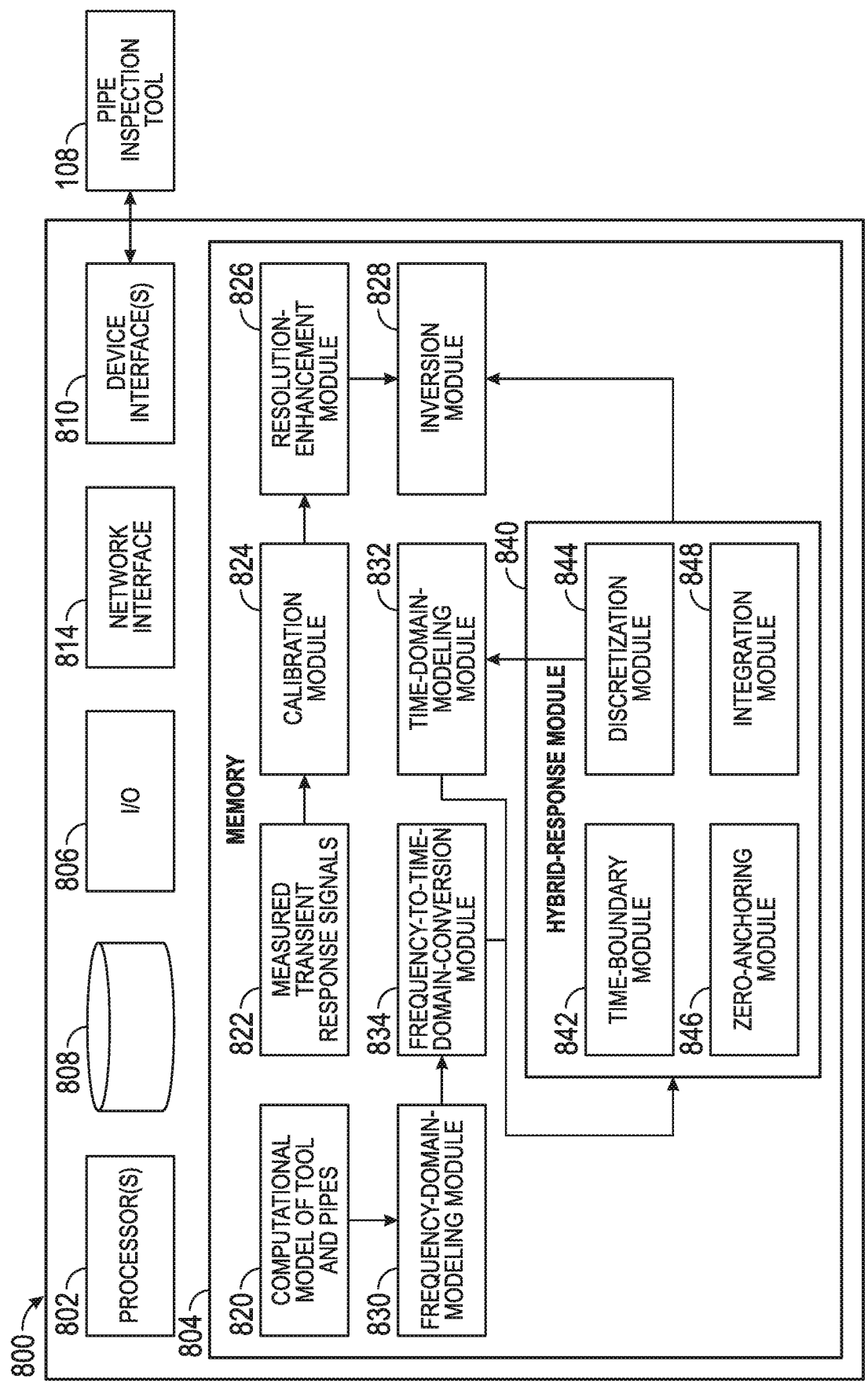
FIG. 8 is a block diagram of an example computing system for computing hybrid synthetic transient response signals in accordance with various embodiments.

FIG. 8 is a block diagram of an example processing facility 800 for computing hybrid synthetic transient response signals in accordance with various embodiments. The processing facility 800 may be implemented, e.g., in a surface logging facility 116 or a computer communicating with the surface logging facility, or in processing circuitry 124 integrated into the pipe inspection tool 108. The processing facility 800 includes one or more processors 802 (e.g., a conventional central processing unit (CPU), graphical processing unit, or other) configured to execute software programs stored in memory 804 (which may be, e.g., random-access memory (RAM), read-only memory (ROM), flash memory, etc.). The processor(s) 802 may be single-core or multi-core processors. Multiple processor cores may be used beneficially, e.g., to speed up the time-domain simulation by parallelizing it across the cores. In some embodiments, the processing facility 800 further includes user input/output devices 806 (e.g., a screen, keyboard, mouse, etc.), permanent data-storage devices 808 (including, e.g., solid-state, optical, and/or magnetic machine-readable media such as hard disks, CD-ROMs, DVD-ROMs, etc.), device interfaces 810 for communicating directly or indirectly with the pipe inspection tool 108, a network interface 814 that facilitates communication with other computer systems and/or data repositories, and a system bus (not shown) through which the other components of the processing facility 800 communicate. The processing facility 800 may, for example, be a general-purpose computer that has suitable software for implementing the computational methods described herein installed thereon. While shown as a single unit, the processing facility 800 may also be distributed over multiple machines connected to each other via a wired or wireless network such as a local network or the Internet.

The software programs stored in the memory 804 include processor-executable instructions for performing the methods described herein, and may be implemented in any of various programming languages, for example and without limitation, C, C++, Object C, Pascal, Basic, Fortran, Matlab, and Python. The memory 804 may also store, in addition to or as part of the software programs, data on which the instructions operate, such as the computational model 820 of the tool and the set of pipes, which includes one or more adjustable pipe parameters, and the measured transient response signals 822. The instructions themselves may be grouped into various functional modules, e.g., for the purpose of re-use and sharing of the functionality of certain modules with other modules. In accordance with the depicted embodiment, the modules include, for instance, a calibration module 824 and a resolution-enhancement module 826 for preparing the logs for subsequent inversion (in accordance with acts 408, 410 of the method depicted in FIG. 4); an inversion module 828 for numerically optimizing the adjustable pipe parameters of the computational model 820 based on a cost function quantifying the mismatch between measured and synthetic transient response signals; a frequency-domain modeling module 830, a time-domain modeling module 832, and a frequency-to-time-domain conversion module 834 for computing the frequency-domain-based and time-domain-based (i.e., first and second) synthetic transient response signals; and a hybrid-response module 840 for combining the first and second transient response signals into the hybrid transient response signal. The hybrid-response module 840 may include multiple sub-modules, such as a time-boundary module 842 for determining the time boundary at which time-domain modeling begins; a discretization module 844 for determining the time step and spatial discretization employed by the time-domain modeling module 832, which may include boosting the electrical permittivity and (optionally) borehole-fluid conductivity that go into the time-step computation; a zero-anchoring module 846 for matching the frequency-domain-based and time-domain-based portions of the synthetic impulse response signals; and an integration module 848 for obtaining the synthetic step response signals from the impulse response signals.

Of course, the computational functionality described herein can be grouped and organized in many different ways, the depicted grouping being just one example. Further, the various computational modules depicted in FIG. 8 need not all be part of the same software program or even stored on the same machine. Rather, certain groups of modules can operate independently of the others and provide data output that can be stored and subsequently provided as input to other modules. For example, the modules 830, 832, 834, 836 for computing the synthetic response signals may be executed on one machine to precompute synthetic response signals for various combinations of pipe-parameter values and to cause the synthetic response signals to be stored in a database. The database may subsequently be accessed by the inversion module 828, which may be stored on another machine, to look up the synthetic response signal for a set of pipe-parameter values used in a given iteration of the inversion process. Further, as will be readily appreciated by those of ordinary skill in the art, software programs implementing the methods described herein (e.g., organized into functional modules as depicted in FIG. 8) may be stored, separately from any processing facility, in one or more non-volatile machine-readable media (such as, without limitation, solid-state, optical, or magnetic storage media), from which they may be loaded into (volatile) system memory of a processing facility for execution.

In general, the processing facility carrying out the computational functionality described herein (optionally as organized into various functional modules) can be implemented with any suitable combination of hardware, firmware, and/or software. For example, the processing facility may be permanently configured (e.g., with hardwired circuitry) or temporarily configured (e.g., programmed), or both in part, to implement the described functionality. A tangible entity configured, whether permanently and/or temporarily, to operate in a certain manner or to perform certain operations described herein, is herein termed a "hardware-implemented module" or "hardware module," and a hardware module using one or more processors is termed a "processor-implemented module." Hardware modules may include, for example, dedicated circuitry or logic that is permanently configured to perform certain operations, such as a field-programmable gate array (FPGA), application-specific integrated circuit (ASIC), or other special-purpose processor. A hardware module may also include programmable logic or circuitry, such as a general-purpose processor, that is temporarily configured by software to perform certain operations. Considering example embodiments in which hardware modules are temporarily configured, the hardware modules collectively implementing the described functionality need not all co-exist at the same time, but may be configured or instantiated at different times. For example, where a hardware module comprises a general-purpose processor configured by software to implement a special-purpose module, the general-purpose processor may be configured for respectively different special-purpose modules at different times.

Figure 9A:
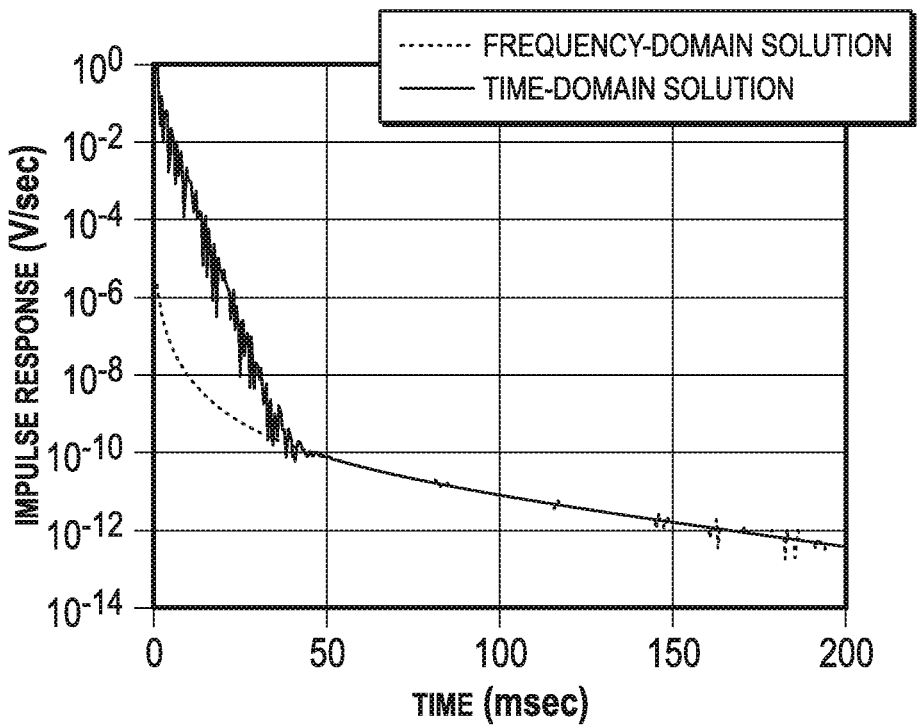
FIGS. 9A-9C are graphs of time-domain-based and frequency-domain-based synthetic impulse response signals, a hybrid impulse response signal computed therefrom in accordance with various embodiments, and corresponding frequency-domain-based and hybrid step response signals, respectively, for an example pipe configuration including one pipe.
Figure 9B:
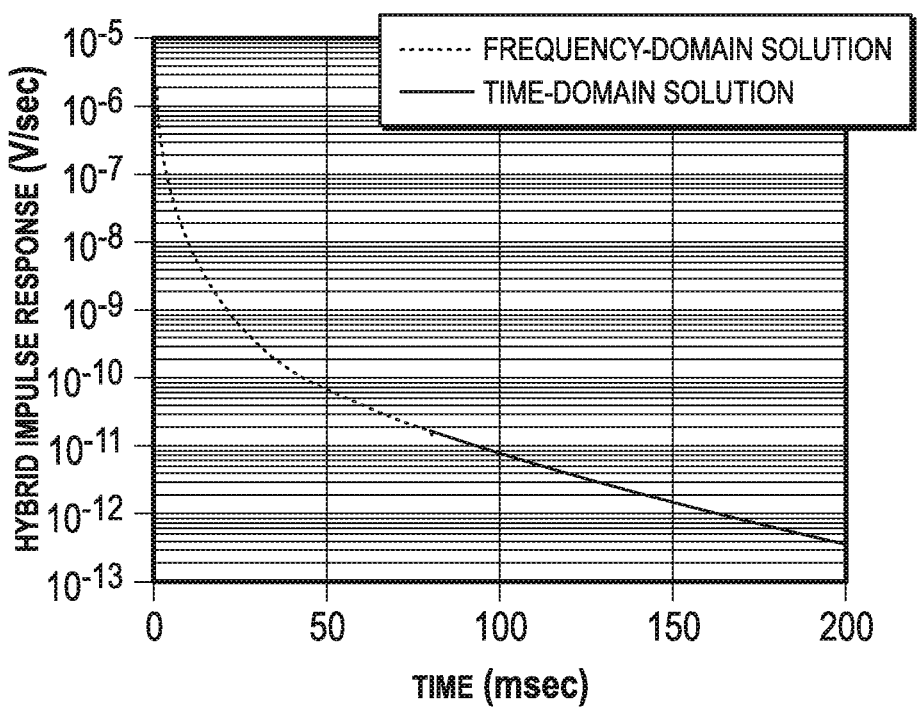
Figure 9C:
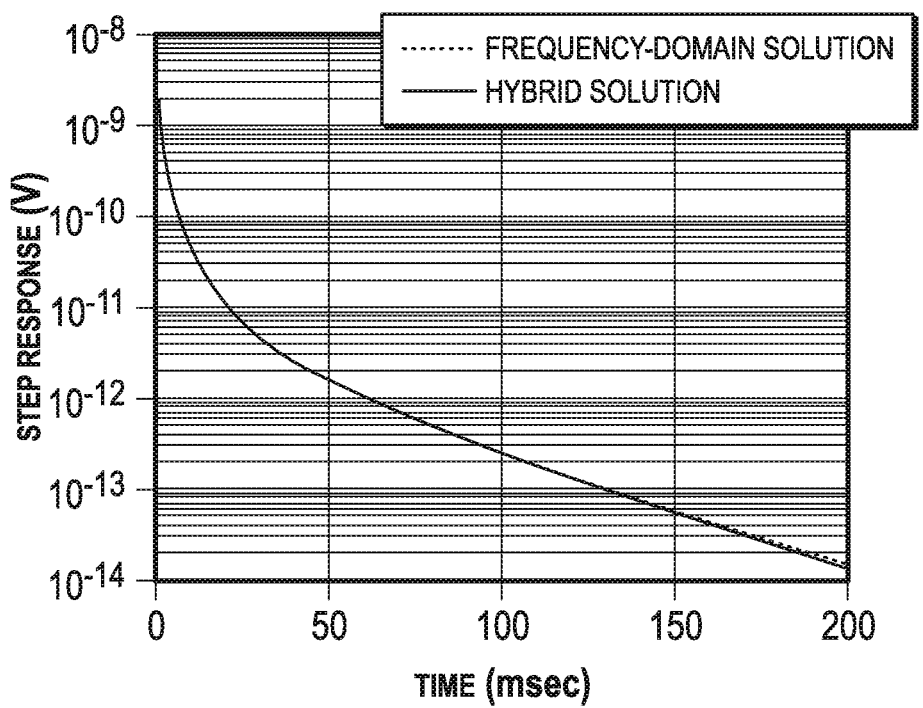
Figure 10A:
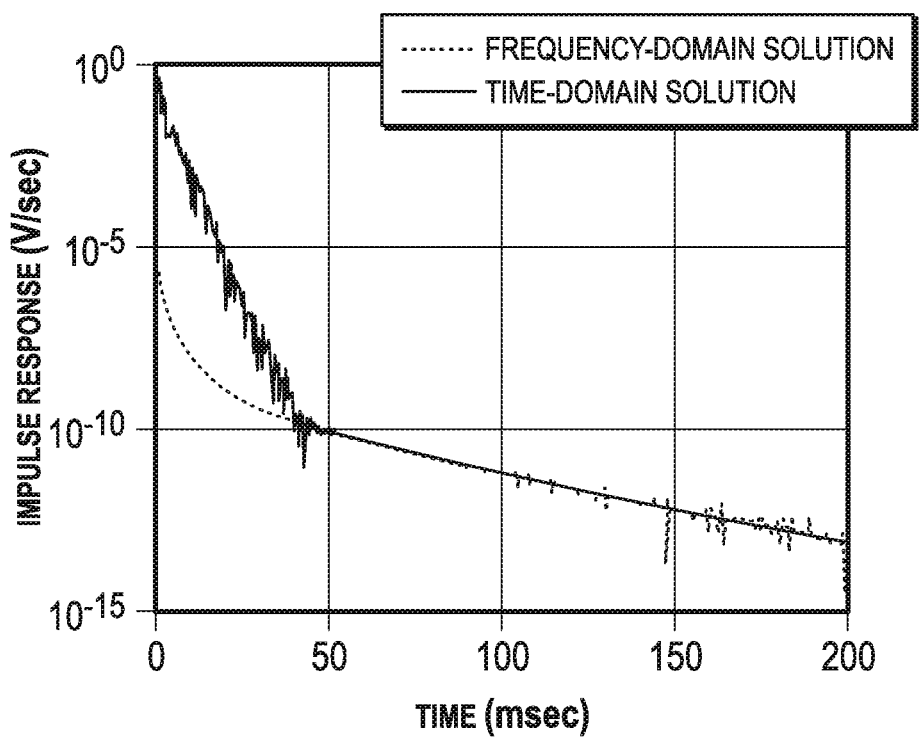
FIGS. 10A-10C are graphs of time-domain-based and frequency-domain-based synthetic impulse response signals, a hybrid impulse response signal computed therefrom in accordance with various embodiments, and corresponding frequency-domain-based and hybrid step response signals, respectively, for an example pipe configuration including two nested pipes.
Figure 10B:
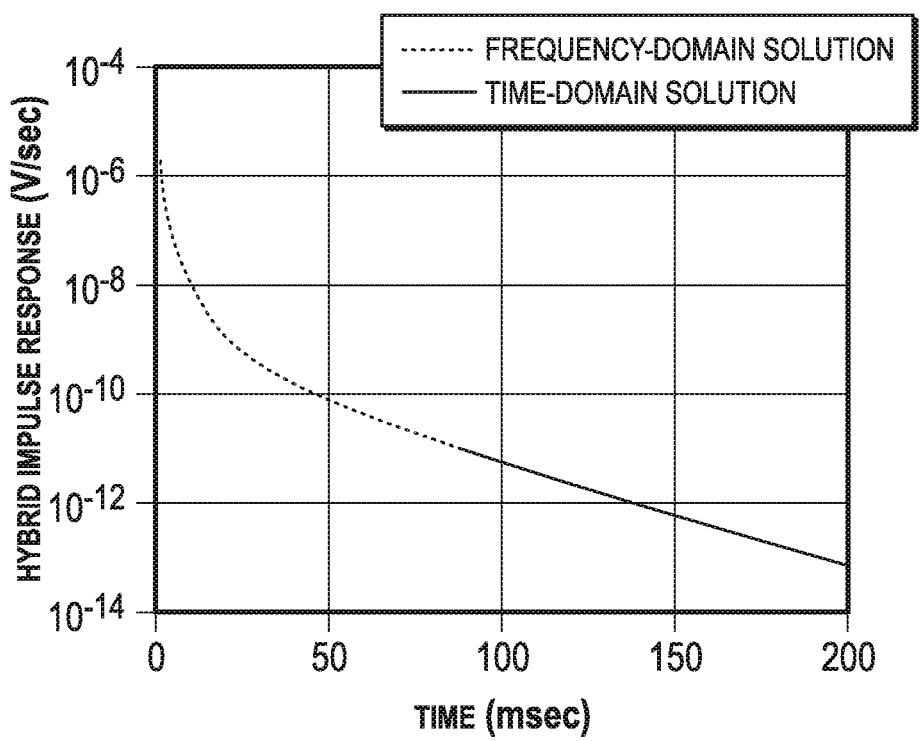
Figure 10C:
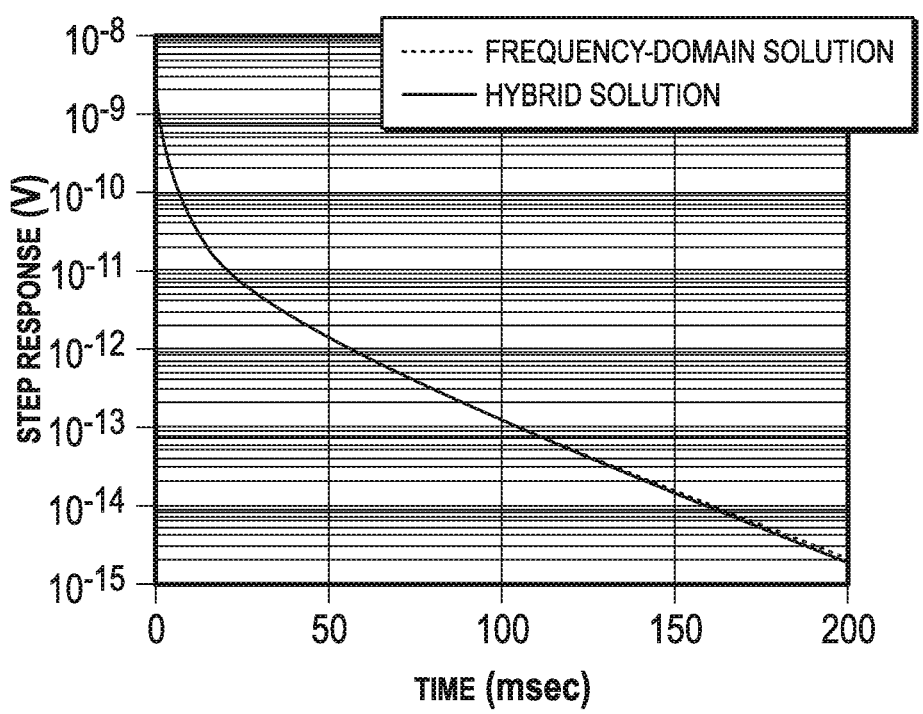
Figure 11A:
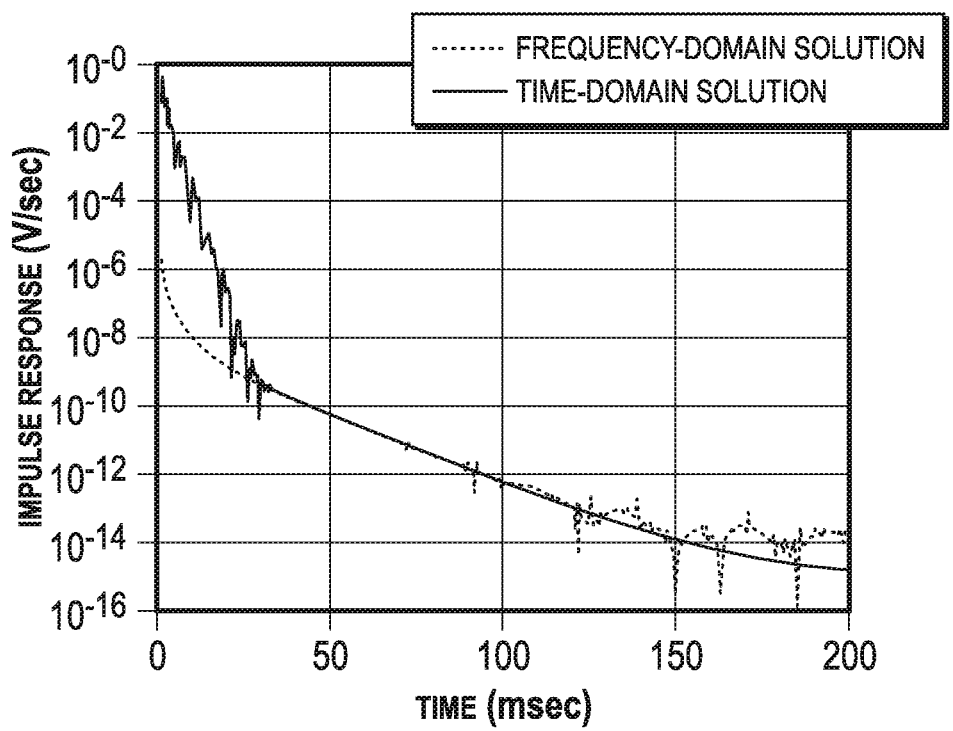
FIGS. 11A-11C are graphs of time-domain-based and frequency-domain-based synthetic impulse response signals, a hybrid impulse response signal computed therefrom in accordance with various embodiments, and corresponding frequency-domain-based and hybrid step response signals, respectively, for an example pipe configuration including three nested pipes.
Figure 11B:
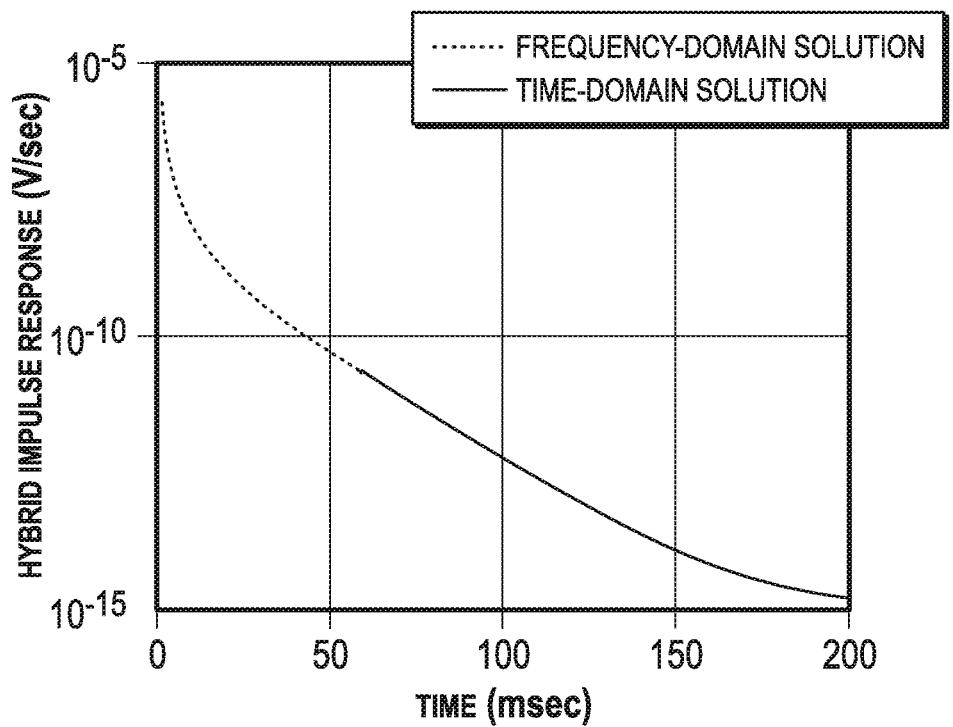
Figure 11C:
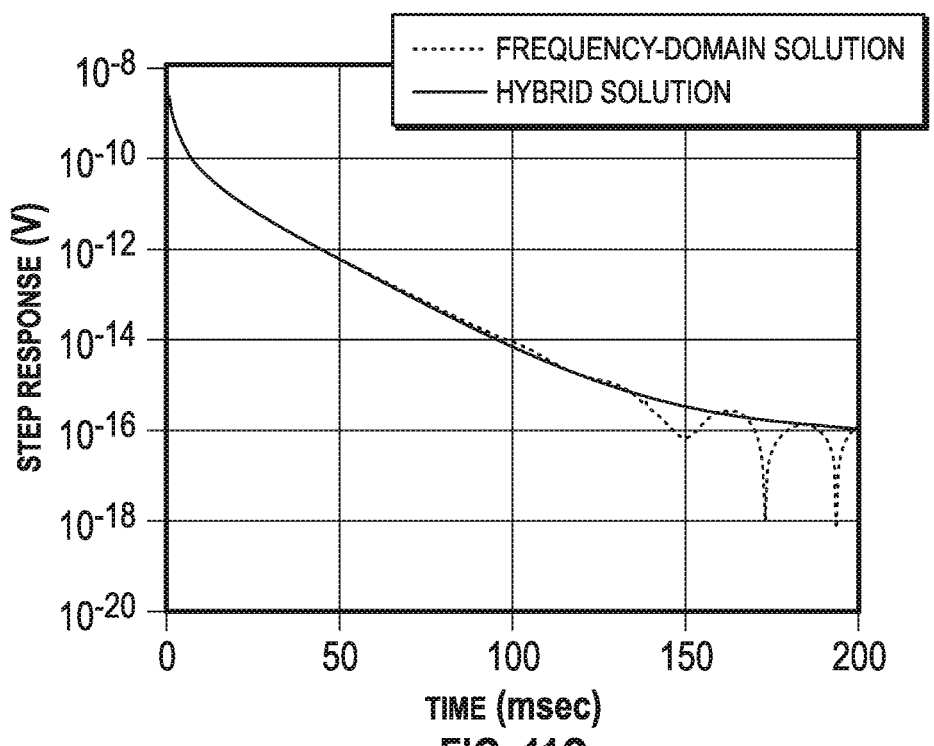
Figure 12A:
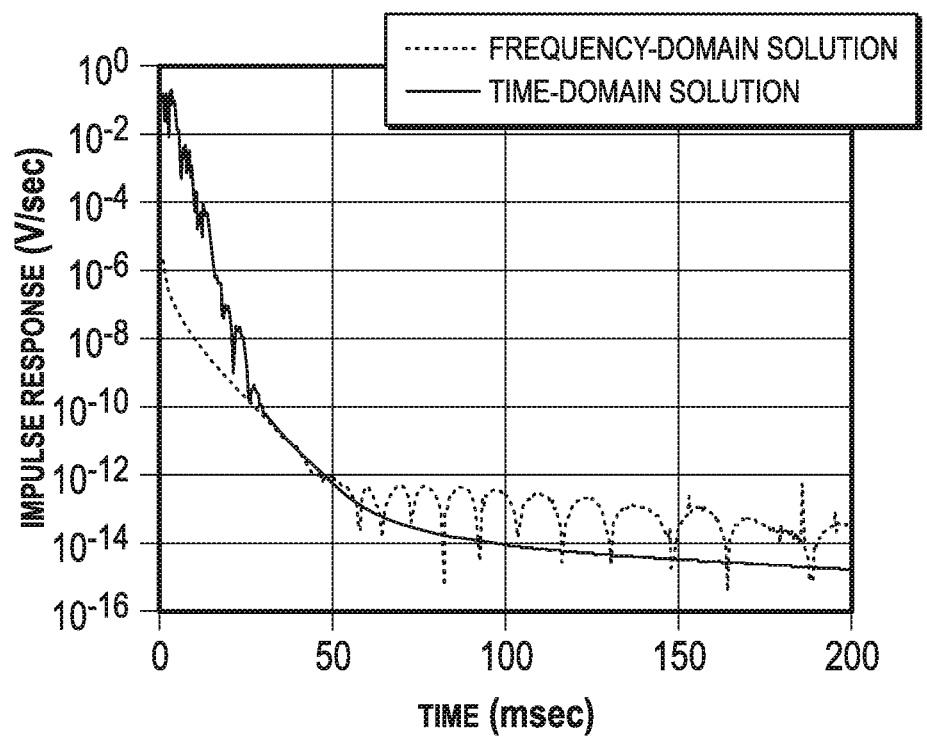
FIGS. 12A-12C are graphs of time-domain-based and frequency-domain-based synthetic impulse response signals, a hybrid impulse response signal computed therefrom in accordance with various embodiments, and corresponding frequency-domain-based and hybrid step response signals, respectively, for an example pipe configuration including four nested pipes.
Figure 12B:
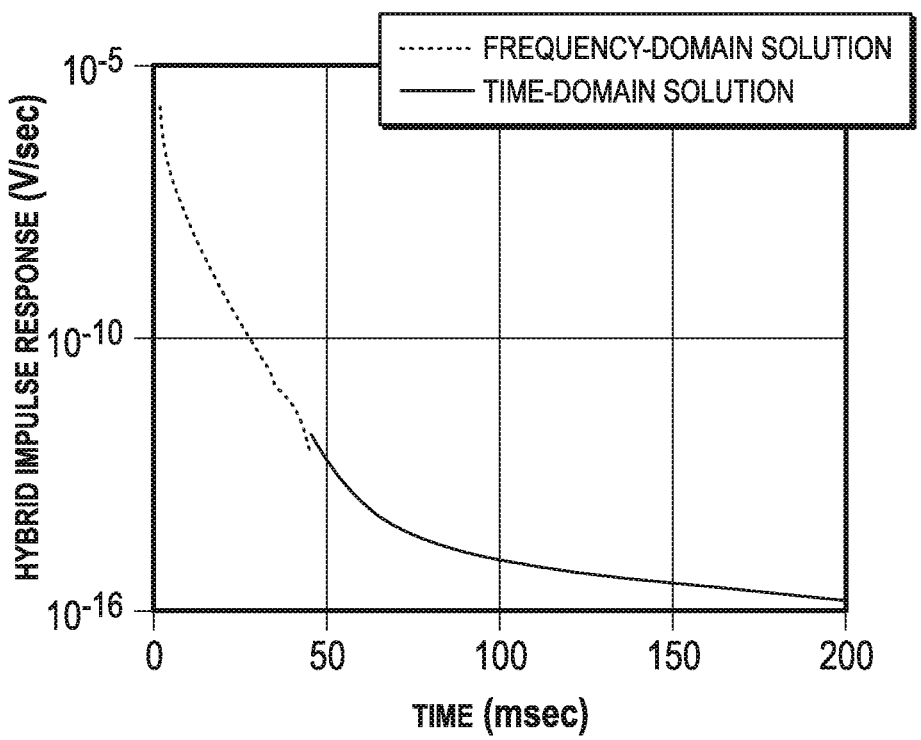
Figure 12C:
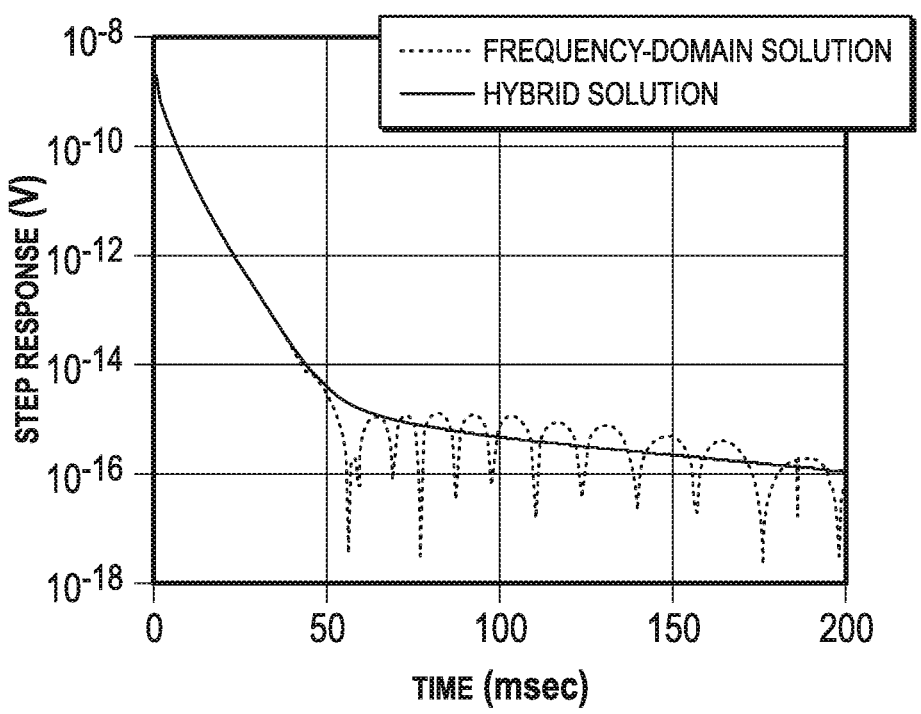

FIGS. 9A-12C are graphs of time-domain-based, frequency-domain-based, and hybrid synthetic impulse response signals computed in accordance with one embodiment for example pipe configurations. FIGS. 9A-9C illustrate the responses signals for a configuration of four nested pipes, FIGS. 10A-10C for three nested pipes, FIGS. 11A-11C for two nested pipes, and FIGS. 12A-12C for a single pipe. The computational model underlying the computation of the response signals is summarized in Tables 1 and 2, with Table 1 showing pipe parameters of the four pipes and Table 2 showing the dimensions of the transmitter and receiver of the pipe inspection tool.

TABLE 1

| Pipe | Outer diameter [inches] | Thickness [inches] | Conductivity [S/m] | Relative permeability |
|---|---|---|---|---|
| 1 | 4½ | 0.2 | $0.4 \cdot 10^7$ | 80 |
| 2 | 7⅝ | 0.2 | $0.4 \cdot 10^7$ | 80 |
| 3 | 9⅝ | 0.2 | $0.4 \cdot 10^7$ | 80 |
| 4 | 13⅜ | 0.2 | $0.4 \cdot 10^7$ | 80 |

TABLE 2

| | Diameter [inches] | Length [inches] |
|---|---|---|
| Transmitter | 1 | 9 |
| Receiver | 0.5 | 9 |

The time-domain-based response signals were computed by FDTD modeling for a spatial domain set to 15 m in the radial direction (measured from the center of the borehole) and 30 m in the axial direction. The spatial discretization grid was auto-generated by sampling the skin depth corresponding to the highest frequency of interest in each medium by at least ten grid points. Coils with finite length were modeled by placing fifteen equally spaced discrete transmitting and receiving coils within the extent of the extended coils. The tool was modeled as an air-core tool (i.e., without a magnetic core), which provides a more challenging test case than a tool with a magnetic core since it generally results in a response with a higher dynamic range.

FIGS. 9A, 10A, 11A, and 12A show synthetic impulse response signals computed with frequency-domain and time-domain solvers. The frequency-domain-based impulse response signals for all four pipe configurations exhibit instabilities at late times, manifested as spurious oscillations. The amplitude and spread of these oscillations increase as the number of pipes decrease. The FDTD solution provides stable, oscillation-free impulse response signals for $t > t_{max}$. At early times, the chosen spatial discretization is not adequate to resolve the small skin depth associated with the high frequency spectrum of the decay response, and hence the FDTD-based signal exhibits spurious oscillation. FIGS. 9B, 10B, 11B, and 12B show the hybrid impulse response signals, which are stable for both early and late times. The hybrid step response signals computed from the impulse response signals by integration are shown in FIGS. 9C, 10C, 11C, and 12C, along, for comparison, with frequency-domain-based step response signals.

The following numbered examples are illustrated embodiments.

1. A method comprising: using an electromagnetic induction tool disposed interior to a set of pipes, inducing pulsed eddy currents in the set of pipes and measuring a time-dependent transient response signal; creating a computational model of the tool and the set of pipes, the model comprising one or more pipe parameters; and using numerical inversion to determine values of the one or more pipe parameters that minimize a mismatch between the measured transient response signal and a synthetic transient response signal computed based on the model, computation of the synthetic transient response signal comprising computing frequency-domain response signals for a plurality of frequencies, and using frequency-to-time-domain transformation to convert the plurality of computed frequency-domain response signals to a first synthetic transient response signal, automatically determining a time boundary associated with an onset of spurious oscillations in the first synthetic transient response signal, computing a second synthetic transient response signal beginning at the determined time boundary directly with a time-domain numerical technique, and combining a portion of the first synthetic transient response signal ending at the time boundary with the second synthetic transient response signal.

2. The method of example 1, wherein the first and second synthetic transient response signals are step response signals.

3. The method of example 1, wherein the first and second synthetic transient response signals are impulse response signals, the method further comprising integrating the combined first and second synthetic transient response signals to obtain a synthetic step response signal.

4. The method of example 3, further comprising anchoring the synthetic step response signal to zero at a point in time greater than a maximum time of interest.

5. The method of any of the preceding examples, wherein the second synthetic transient response signal is computed using spatial and time discretizations determined based at least in part on a maximum frequency of interest, the maximum frequency of interest being set at least initially to substantially an inverse of the time boundary.

6. The method of example 5, further comprising increasing the spatial and time discretizations at least once during computation of the second synthetic transient response signal based on a decrease of the maximum frequency of interest for later times.

7. The method of any of the preceding examples, wherein the second synthetic transient response signal is computed using a time discretization determined based at least in part on a relative permittivity of a material filling a space between the pipes, the relative permittivity being boosted by a factor of at least ten, the factor being determined based at least in part on the time boundary and a conductivity of a borehole fluid interior to the pipes.

8. The method of example 7, wherein the conductivity of the borehole fluid is boosted by a factor of at least ten, an error in the second synthetic response signal resulting from the boosting being maintained below ten percent.

9. The method of example 7 or example 8, wherein the factor is adjusted to a higher value at least once during computation of the second synthetic transient response signal.

10. The method of any of the preceding examples, wherein the numerical inversion comprises iteratively adjusting the values of the one or more pipe parameters, computing the synthetic transient response signal from the adjusted parameters, and determining the mismatch between the measured transient response signal and the synthetic transient response signal.

11. The method of any of the preceding examples, wherein the numerical inversion comprises precomputing a plurality of synthetic decay response signals for a respective plurality of sets of values of the one or more pipe parameters, and selecting, among the plurality of precomputed synthetic transient response signals, the synthetic transient response signal that minimizes the mismatch.

12. A system comprising: an electromagnetic induction tool for disposal interior to a set of pipes, the tool comprising at least one transmitter, at least one receiver, and associated circuitry collectively configured to induce pulsed eddy currents in the set of nested pipes and to measure a time-dependent transient response signal; a processing facility configured to store a computational model of the tool and the set of pipes, the model comprising one or more pipe parameters, and to use numerical inversion to determine values of the one or more pipe parameters that minimize a mismatch between the measured transient response signal and a synthetic transient response signal computed based on the model, computation of the synthetic transient response signal comprising computing frequency-domain response signals for a plurality of frequencies, and using frequency-to-time-domain transformation to convert the plurality of computed frequency-domain response signals to a first synthetic transient response signal, automatically determining a time boundary associated with an onset of spurious oscillations within the first synthetic transient response signal, computing a second synthetic transient response signal beginning at the determined time boundary directly with a time-domain numerical technique, and combining a portion of the first synthetic transient response signal ending at the time boundary with the second synthetic transient response signal.

13. The system of example 12, wherein the processing facility is configured to determine spatial and time discretizations for computing the second synthetic transient response signal based at least in part on a maximum frequency of interest, the maximum frequency of interest being set at least initially to substantially an inverse of the time boundary.

14. The system of example 12 or example 13, wherein the processing facility is configured to determine a time step for computing the second synthetic transient response signal based at least in part on a relative permittivity of a material filling a space between the pipes, the relative permittivity being boosted by a factor of at least ten, the factor being determined based at least in part on the time boundary and a conductivity of a borehole fluid interior to the pipes.

15. A machine-readable medium storing processor-executable instructions which, when executed by one or more processors, cause the one or more processors to simulate induction of pulsed eddy currents in a set of one or more pipes characterized by one or more adjustable pipe parameters, and to compute a resulting synthetic transient response signal for a plurality of sets of values of the one or more adjustable pipe parameters, computation of the synthetic transient response signal for each of the sets of values comprising: computing frequency-domain response signals for a plurality of frequencies, and using frequency-to-time-domain transformation to convert the plurality of computed frequency-domain response signals to a first synthetic transient response signal; automatically determining a time boundary associated with an onset of spurious oscillations within the first synthetic transient response signal; computing a second synthetic transient response signal beginning at the determined time boundary directly with a time-domain numerical technique; and combining a portion of the first synthetic transient response signal ending at the time boundary with the second synthetic transient response signal.

16. The machine-readable medium of example 15, further storing a computational model of the set of one or more pipes and of an electromagnetic induction tool disposed interior to the set of one or more pipes.

17. The machine-readable medium of example 15 or example 16, further storing a measured transient response signal, and processor-executable instructions which, when executed by the one or more processors, cause the one or more processors to determine values of the one or more pipe parameters that minimize a mismatch between the measured transient response signal and the synthetic transient response signal.

18. The machine-readable medium of any of examples 15-17, wherein the processor-executable instructions cause the one or more processors to compute the second synthetic transient response signal using spatial and time discretizations determined based at least in part on a maximum frequency of interest, the maximum frequency of interest being set at least initially to substantially an inverse of the time boundary.

19. The machine-readable medium of any of examples 15-18, wherein the processor-executable instructions cause the one or more processors to increase the spatial and time discretizations at least once during computation of the second synthetic transient response signal based on a decrease of the maximum frequency of interest for later times.

20. The machine-readable medium of any of examples 15-19, wherein the processor-executable instructions cause the one or more processors to compute the second synthetic transient response signal using a time step determined based at least in part on a relative permittivity of a material filling a space between the pipes, the relative permittivity being boosted by a factor of at least ten, the factor being determined based at least in part on the time boundary and a conductivity of a borehole fluid interior to the pipes.

Many variations may be made in the systems, tools, and methods described and illustrated herein without departing from the scope of the inventive subject matter. Accordingly, the specific embodiments and examples described are intended to be illustrative and not limiting.

What is claimed is:

1. A method comprising:
   using an electromagnetic induction tool disposed interior to a set of pipes, inducing pulsed eddy currents in the set of pipes and measuring a time-dependent transient response signal;
   creating a computational model of the electromagnetic induction tool and the set of pipes, the computational model comprising one or more pipe parameters; and
   using numerical inversion to determine values of the one or more pipe parameters that minimize a mismatch between the measured time-dependent transient response signal and a synthetic transient response signal computed based on the computational model, computation of the synthetic transient response signal comprising:
     computing frequency-domain response signals for a plurality of frequencies, and using frequency-to-time-domain transformation to convert the plurality of computed frequency-domain response signals to a first synthetic transient response signal;
     automatically determining a time boundary associated with an onset of spurious oscillations in the first synthetic transient response signal;
     computing a second synthetic transient response signal beginning at the determined time boundary directly with a time-domain numerical technique; and
     combining a portion of the first synthetic transient response signal ending at the time boundary with the second synthetic transient response signal.

2. The method of claim 1, wherein the first and second synthetic transient response signals are step response signals.

3. The method of claim 1, wherein the first and second synthetic transient response signals are impulse response signals, the method further comprising integrating the combined first and second synthetic transient response signals to obtain a synthetic step response signal.

4. The method of claim 3, further comprising anchoring the synthetic step response signal to zero at a point in time greater than a maximum time of interest.

5. The method of claim 1, wherein the second synthetic transient response signal is computed using spatial and time discretizations determined based at least in part on a maximum frequency of interest, the maximum frequency of interest being set at least initially to substantially an inverse of the time boundary.

6. The method of claim 5, further comprising increasing the spatial and time discretizations at least once during computation of the second synthetic transient response signal based on a decrease of the maximum frequency of interest for later times.

7. The method of claim 1, wherein the second synthetic transient response signal is computed using a time discretization determined based at least in part on a relative permittivity of a material filling a space between pipes of the set of pipes, the relative permittivity being boosted by a factor of at least ten, the factor being determined based at least in part on the time boundary and a conductivity of a borehole fluid interior to the set of pipes.

8. The method of claim 7, wherein the conductivity of the borehole fluid is boosted by a factor of at least ten, wherein an error in the second synthetic response signal resulting from the boosting is maintained below ten percent.

9. The method of claim 7, wherein the factor is adjusted to a higher value at least once during computation of the second synthetic transient response signal.

10. The method of claim 1, wherein the numerical inversion comprises iteratively adjusting values of the one or more pipe parameters, computing the synthetic transient response signal from the adjusted values of the one or more pipe parameters, and determining the mismatch between the measured time-dependent transient response signal and the synthetic transient response signal.

11. The method of claim 1, wherein the numerical inversion comprises precomputing a plurality of synthetic decay response signals for a respective plurality of sets of values of the one or more pipe parameters, and selecting, among the plurality of precomputed synthetic transient response signals, the synthetic transient response signal that minimizes the mismatch.

12. A system comprising:
   an electromagnetic induction tool for disposal interior to a set of pipes, the electromagnetic induction tool comprising at least one transmitter, at least one receiver, and associated circuitry collectively configured to induce pulsed eddy currents in the set of pipes and to measure a time-dependent transient response signal;

a processing facility configured to
  store a computational model of the electromagnetic induction tool and the set of pipes, the computational model comprising one or more pipe parameters; and
  use numerical inversion to determine values of the one or more pipe parameters that minimize a mismatch between the measured time-dependent transient response signal and a synthetic transient response signal computed based on the computational model, computation of the synthetic transient response signal comprising:
    computing frequency-domain response signals for a plurality of frequencies, and using frequency-to-time-domain transformation to convert the plurality of computed frequency-domain response signals to a first synthetic transient response signal;
    automatically determining a time boundary associated with an onset of spurious oscillations within the first synthetic transient response signal;
    computing a second synthetic transient response signal beginning at the determined time boundary directly with a time-domain numerical technique; and
    combining a portion of the first synthetic transient response signal ending at the time boundary with the second synthetic transient response signal.

13. The system of claim 12, wherein the processing facility is configured to determine spatial and time discretizations for computing the second synthetic transient response signal based at least in part on a maximum frequency of interest, the maximum frequency of interest being set at least initially to substantially an inverse of the time boundary.

14. The system of claim 12, wherein the processing facility is configured to determine a time step for computing the second synthetic transient response signal based at least in part on a relative permittivity of a material filling a space between pipes of the set of pipes, the relative permittivity being boosted by a factor of at least ten, the factor being determined based at least in part on the time boundary and a conductivity of a borehole fluid interior to the set of pipes.

15. A machine-readable medium storing:
  processor-executable instructions which, when executed by one or more processors, cause the one or more processors to simulate induction of pulsed eddy currents in a set of one or more pipes characterized by one or more adjustable pipe parameters, and to compute a resulting synthetic transient response signal for a plurality of sets of values of the one or more adjustable pipe parameters, computation of the resulting synthetic transient response signal for each of the sets of values comprising:
    computing frequency-domain response signals for a plurality of frequencies, and using frequency-to-time-domain transformation to convert the plurality of computed frequency-domain response signals to a first synthetic transient response signal;
    automatically determining a time boundary associated with an onset of spurious oscillations within the first synthetic transient response signal;
    computing a second synthetic transient response signal beginning at the determined time boundary directly with a time-domain numerical technique; and
    combining a portion of the first synthetic transient response signal ending at the time boundary with the second synthetic transient response signal.

16. The machine-readable medium of claim 15, further storing a computational model of the set of one or more pipes and of an electromagnetic induction tool disposed interior to the set of one or more pipes.

17. The machine-readable medium of claim 15, further storing
  a measured transient response signal; and
  processor-executable instructions which, when executed by the one or more processors, cause the one or more processors to determine values of the one or more pipe parameters that minimize a mismatch between the measured transient response signal and the resulting synthetic transient response signal.

18. The machine-readable medium of claim 15, wherein the processor-executable instructions cause the one or more processors to compute the second synthetic transient response signal using spatial and time discretizations determined based at least in part on a maximum frequency of interest, the maximum frequency of interest being set at least initially to substantially an inverse of the time boundary.

19. The machine-readable medium of claim 18, wherein the processor-executable instructions cause the one or more processors to increase the spatial and time discretizations at least once during computation of the second synthetic transient response signal based on a decrease of the maximum frequency of interest for later times.

20. The machine-readable medium of claim 15, wherein the processor-executable instructions cause the one or more processors to compute the second synthetic transient response signal using a time step determined based at least in part on a relative permittivity of a material filling a space between pipes of the one or more pipes, the relative permittivity being boosted by a factor of at least ten, the factor being determined based at least in part on the time boundary and a conductivity of a borehole fluid interior to the one or more pipes.

* * * * *